(12) United States Patent
Clark

(10) Patent No.: US 11,427,694 B2
(45) Date of Patent: *Aug. 30, 2022

(54) METHODS FOR MANUFACTURING BULKED CONTINUOUS FILAMENT

(71) Applicant: Aladdin Manufacturing Corporation, Calhoun, GA (US)

(72) Inventor: Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/866,708

(22) Filed: May 5, 2020

(65) Prior Publication Data

US 2020/0262124 A1    Aug. 20, 2020

Related U.S. Application Data

(60) Continuation of application No. 16/220,905, filed on Dec. 14, 2018, now Pat. No. 10,654,211, which is a
(Continued)

(51) Int. Cl.
*B29B 17/00* (2006.01)
*C08J 11/04* (2006.01)
(Continued)

(52) U.S. Cl.
CPC .............. *C08J 11/04* (2013.01); *B29B 13/06* (2013.01); *B29B 17/0026* (2013.01);
(Continued)

(58) Field of Classification Search
CPC ...... B29B 2013/005; B29B 2017/0015; B29C 37/006; B29C 48/022; B29C 48/05;
(Continued)

(56) References Cited

U.S. PATENT DOCUMENTS 1,490,918 A    4/1924 Gaede
2,146,532 A    2/1939 Crane
(Continued)

FOREIGN PATENT DOCUMENTS

AU    2013267847    3/2014
AU    2014215998    9/2014
(Continued)

OTHER PUBLICATIONS

Final Office Action, dated Jul. 8, 2020, from corresponding U.S. Appl. No. 15/910,853.
(Continued)

*Primary Examiner* — Leo B Tentoni
(74) *Attorney, Agent, or Firm* — Brient IP Law, LLC

(57) ABSTRACT

A method of manufacturing bulked continuous carpet filament, in various embodiments, comprises: (A) providing an expanded surface area extruder; (B) providing a spinning machine having an inlet that is operatively coupled to an expanded surface area extruder outlet; (C) using a pressure regulation system to reduce the pressure within the expanded surface area extruder; (D) passing a plurality of flakes comprising recycled PET through the expanded surface area extruder to at least partially melt the plurality of flakes to form a polymer melt; and (E) substantially immediately after passing the plurality of flakes through the expanded surface area extruder, using the spinning machine to form the polymer melt into bulked continuous carpet filament. In some embodiments, the method may include passing the plurality of flakes comprising recycled PET through a PET crystallizer prior to extrusion.

20 Claims, 5 Drawing Sheets

Related U.S. Application Data continuation of application No. 15/473,402, filed on Mar. 29, 2017, now Pat. No. 10,232,542, which is a continuation of application No. 14/546,819, filed on Nov. 18, 2014, now Pat. No. 9,630,353, which is a continuation-in-part of application No. 13/892,740, filed on May 13, 2013, now abandoned, which is a division of application No. 13/721,955, filed on Dec. 20, 2012, now Pat. No. 8,597,553.

(60) Provisional application No. 61/654,016, filed on May 31, 2012.

(51) Int. Cl.

| | | |
|---|---|---|
| *B29D 99/00* | (2010.01) | |
| *B29C 48/435* | (2019.01) | |
| *B29C 48/05* | (2019.01) | |
| *B29C 48/00* | (2019.01) | |
| *B29C 48/38* | (2019.01) | |
| *B29C 48/92* | (2019.01) | |
| *B29C 48/14* | (2019.01) | |
| *B29C 48/385* | (2019.01) | |
| *D01D 1/10* | (2006.01) | |
| *D01F 6/62* | (2006.01) | |
| *B29C 48/76* | (2019.01) | |
| *B29C 48/255* | (2019.01) | |
| *B29C 48/44* | (2019.01) | |
| *B29C 48/43* | (2019.01) | |
| *B29C 48/525* | (2019.01) | |
| *B29C 48/40* | (2019.01) | |
| *B29C 48/425* | (2019.01) | |
| *D02G 3/24* | (2006.01) | |
| *B29B 13/06* | (2006.01) | |
| *B29B 17/02* | (2006.01) | |
| *B29B 17/04* | (2006.01) | |
| *D01D 5/08* | (2006.01) | |
| *B29K 67/00* | (2006.01) | |
| *B29L 31/00* | (2006.01) | |
| *B29B 13/00* | (2006.01) | |
| *B29K 105/26* | (2006.01) | |

(52) U.S. Cl.
CPC .......... *B29B 17/02* (2013.01); *B29B 17/0412* (2013.01); *B29C 48/0022* (2019.02); *B29C 48/022* (2019.02); *B29C 48/05* (2019.02); *B29C 48/144* (2019.02); *B29C 48/255* (2019.02); *B29C 48/2552* (2019.02); *B29C 48/38* (2019.02); *B29C 48/385* (2019.02); *B29C 48/40* (2019.02); *B29C 48/425* (2019.02); *B29C 48/43* (2019.02); *B29C 48/435* (2019.02); *B29C 48/44* (2019.02); *B29C 48/525* (2019.02); *B29C 48/766* (2019.02); *B29C 48/767* (2019.02); *B29C 48/92* (2019.02); *B29D 99/0078* (2013.01); *D01D 1/103* (2013.01); *D01D 1/106* (2013.01); *D01D 5/08* (2013.01); *D01F 6/62* (2013.01); *D02G 3/24* (2013.01); *B29B 2013/002* (2013.01); *B29B 2013/005* (2013.01); *B29B 2017/0015* (2013.01); *B29B 2017/0279* (2013.01); *B29B 2017/0289* (2013.01); *B29C 2948/922* (2019.02); *B29C 2948/92514* (2019.02); *B29C 2948/92857* (2019.02); *B29K 2067/003* (2013.01); *B29K 2105/26* (2013.01); *B29L 2031/731* (2013.01); *C08J 2367/02* (2013.01); *Y02P 20/143* (2015.11); *Y02W 30/62* (2015.05)

(58) Field of Classification Search
CPC ..... B29C 48/144; B29C 48/425; B29C 48/43; B29C 48/435; B29C 48/44; B29C 48/70; B29C 2791/003; B29C 2791/006; B29K 2105/26; D01D 5/08; D01F 6/62; D02G 3/24
USPC ......... 264/101, 102, 211.21, 211.22, 211.23, 264/920
See application file for complete search history.

(56) References Cited

U.S. PATENT DOCUMENTS

| | | | |
|---|---|---|---|
| 3,217,783 A | 11/1965 | Rodenacker | |
| 3,310,837 A | 3/1967 | Wittrock | |
| 3,357,049 A | 12/1967 | Spindler | |
| 3,608,001 A | 9/1971 | Kowalski et al. | |
| 3,825,236 A | 7/1974 | Hussmann et al. | |
| 3,865,528 A | 2/1975 | Roess | |
| 3,938,924 A | 2/1976 | Abella et al. | |
| 4,057,376 A | 11/1977 | Berger | |
| 4,057,607 A | 11/1977 | Soehngen et al. | |
| 4,128,386 A | 12/1978 | Wissinger et al. | |
| 4,172,477 A | 10/1979 | Reich | |
| 4,192,617 A | 3/1980 | Spielhoff | |
| 4,268,176 A | 5/1981 | Muller | |
| 4,269,798 A | 5/1981 | Ives | |
| 4,272,475 A | 6/1981 | Chi | |
| 4,289,409 A | 9/1981 | Brand | |
| 4,370,302 A | 1/1983 | Suzuoka et al. | |
| 4,564,349 A | 1/1986 | Brown | |
| 4,578,455 A * | 3/1986 | Pipper .................. | C08F 6/00 264/102 X |
| 4,591,487 A | 5/1986 | Fritsch | |
| 4,675,378 A | 6/1987 | Gibbon et al. | |
| 4,919,872 A | 4/1990 | Fintel | |
| 5,102,594 A | 4/1992 | Burlet et al. | |
| 5,108,711 A | 4/1992 | Chszaniecki | |
| 5,143,308 A | 9/1992 | Hally et al. | |
| 5,224,383 A | 7/1993 | Pinto et al. | |
| 5,225,130 A | 7/1993 | Deiringer | |
| 5,266,601 A | 11/1993 | Kyber et al. | |
| 5,306,803 A | 4/1994 | Arlt et al. | |
| 5,339,255 A | 8/1994 | Suzuki et al. | |
| 5,393,140 A | 2/1995 | Blach | |
| 5,424,013 A | 6/1995 | Lieberman | |
| 5,427,881 A | 6/1995 | Sacripante et al. | |
| 5,459,168 A | 10/1995 | Nasr et al. | |
| 5,497,562 A | 3/1996 | Pikus | |
| 5,503,788 A | 4/1996 | Lazareck et al. | |
| 5,510,073 A | 4/1996 | Kaegi et al. | |
| 5,532,035 A | 7/1996 | Corbin et al. | |
| 5,549,957 A | 8/1996 | Negola et al. | |
| 5,554,657 A | 9/1996 | Brownscombe et al. | |
| 5,613,285 A | 3/1997 | Chester et al. | |
| 5,623,012 A | 4/1997 | Hwo | |
| 5,715,584 A | 2/1998 | Coons, III et al. | |
| 5,804,115 A | 9/1998 | Burton et al. | |
| 5,836,682 A | 11/1998 | Blach | |
| 5,886,058 A | 3/1999 | Van Erden et al. | |
| 5,893,702 A | 4/1999 | Conrad et al. | |
| 5,932,691 A | 8/1999 | Khanin et al. | |
| 5,945,215 A | 8/1999 | Bersted et al. | |
| 5,951,159 A | 9/1999 | Schobert-Csongor et al. | |
| 5,958,548 A | 9/1999 | Negola et al. | |
| 5,961,054 A | 10/1999 | Nishibori | |
| 6,007,892 A | 12/1999 | Harwood et al. | |
| 6,074,084 A | 6/2000 | Kolossow | |
| 6,113,825 A | 9/2000 | Chuah | |
| 6,265,533 B1 | 7/2001 | Regel et al. | |
| 6,281,278 B1 | 8/2001 | Takase et al. | |
| 6,394,644 B1 | 5/2002 | Streiff | |
| 6,492,485 B1 | 12/2002 | Gohr et al. | |
| 6,620,354 B1 | 9/2003 | Bessemer et al. | |
| 6,627,127 B1 | 9/2003 | Piovoso et al. | |
| 6,722,117 B2 | 4/2004 | Belcher, Jr. et al. | |

(56) References Cited

U.S. PATENT DOCUMENTS

| | | | |
|---|---|---|---|
| 6,773,718 B2 | 8/2004 | Seth et al. |
| 6,780,941 B2 | 8/2004 | Studholme et al. |
| 6,784,214 B1 | 8/2004 | Bacher et al. |
| 6,852,256 B2 | 2/2005 | Borer et al. |
| 6,866,171 B2 | 3/2005 | Ickinger |
| 6,984,694 B2 | 1/2006 | Blasius, Jr. et al. |
| 7,025,491 B2 | 4/2006 | Blach et al. |
| 7,192,545 B2 | 3/2007 | Ekart et al. |
| 7,198,400 B2 | 4/2007 | Unterlander et al. |
| 7,204,945 B2 | 4/2007 | Bonner |
| 7,262,380 B1 | 8/2007 | Ulrichsen et al. |
| 7,320,589 B2 | 1/2008 | Babin et al. |
| 7,354,988 B2 | 4/2008 | Charati et al. |
| 7,380,973 B2 | 6/2008 | Goedicke et al. |
| 7,485,685 B2 | 2/2009 | Mihan et al. |
| 7,513,677 B2 | 4/2009 | Gneuss et al. |
| 7,594,453 B2 | 9/2009 | Blach |
| 7,628,892 B2 | 12/2009 | Fini |
| 7,647,886 B2 | 1/2010 | Kubista et al. |
| 7,654,725 B2 | 2/2010 | Sturm et al. |
| 7,700,015 B2 | 4/2010 | Kern et al. |
| 7,738,993 B2 | 6/2010 | Silberg et al. |
| 7,744,788 B2 | 6/2010 | Portier et al. |
| 7,799,835 B2 | 9/2010 | Smith et al. |
| 7,828,538 B2 | 11/2010 | Fellinger |
| 7,902,262 B2 | 3/2011 | Armstrong et al. |
| 7,928,150 B2 | 4/2011 | Kannan et al. |
| 7,935,737 B2 | 5/2011 | Gopal et al. |
| 7,980,834 B2 | 7/2011 | Maguire |
| 8,080,190 B2 | 12/2011 | Ichikawa et al. |
| 8,147,738 B2 | 4/2012 | Boczon et al. |
| 8,187,512 B2 | 5/2012 | Eloo et al. |
| 8,398,752 B2 | 3/2013 | Brownstein et al. |
| 8,404,755 B2 | 3/2013 | Sequeira |
| 8,444,886 B2 | 5/2013 | Herve |
| 8,471,972 B2 | 6/2013 | Tsubata |
| 8,557,155 B2 | 10/2013 | Deiss et al. |
| 8,597,553 B1 | 12/2013 | Clark |
| 8,735,457 B2 | 5/2014 | Booth et al. |
| 8,741,972 B2 | 6/2014 | Booth et al. |
| 8,795,811 B2 | 8/2014 | Cloutier et al. |
| 9,061,442 B2 | 6/2015 | Gneuss et al. |
| 9,149,955 B2 | 10/2015 | Bower et al. |
| 9,168,718 B2 | 10/2015 | Westwood et al. |
| 9,409,363 B2 | 8/2016 | Clark |
| 9,550,338 B2 | 1/2017 | Clark |
| 9,630,353 B2 | 4/2017 | Clark |
| 9,630,354 B2 | 4/2017 | Clark |
| 9,636,845 B2 | 5/2017 | Clark |
| 9,636,860 B2 | 5/2017 | Clark |
| 9,908,263 B2 | 3/2018 | Pichler et al. |
| 9,975,278 B2 | 5/2018 | Rabiser et al. |
| 10,124,513 B2 | 11/2018 | Clark |
| 10,532,495 B2 | 1/2020 | Clark |
| 2002/0086077 A1 | 7/2002 | Noller et al. |
| 2004/0053047 A1 | 3/2004 | Jackson et al. |
| 2004/0063860 A1 | 4/2004 | Marston et al. |
| 2004/0082672 A1 | 4/2004 | Zeng et al. |
| 2004/0140248 A1 | 7/2004 | Dauzvardis et al. |
| 2004/0155374 A1 | 8/2004 | Hutchinson et al. |
| 2005/0047267 A1 | 3/2005 | Gneuss et al. |
| 2005/0263941 A1 | 12/2005 | Reutter et al. |
| 2006/0012074 A1 | 1/2006 | Booth et al. |
| 2006/0076705 A1 | 4/2006 | Fowler et al. |
| 2006/0284334 A1 | 12/2006 | Christel |
| 2007/0000947 A1 | 1/2007 | Lewis et al. |
| 2007/0009750 A1 | 1/2007 | Ito et al. |
| 2007/0052131 A1 | 3/2007 | Fujimaki et al. |
| 2007/0200269 A1* | 8/2007 | Ichikawa .............. G03G 15/087 264/140 |
| 2007/0261777 A1 | 11/2007 | Steckelberg et al. |
| 2008/0004202 A1 | 1/2008 | Wolfgang et al. |
| 2008/0069916 A1 | 3/2008 | Regalia |
| 2008/0139700 A1 | 6/2008 | Roden et al. |
| 2008/0157425 A1 | 7/2008 | Rodgers et al. |
| 2008/0214701 A1 | 9/2008 | Wilms et al. |
| 2008/0272508 A1 | 11/2008 | Culbert et al. |
| 2008/0274320 A1 | 11/2008 | Yokoyama et al. |
| 2008/0292831 A1 | 11/2008 | Juriga et al. |
| 2009/0004325 A1 | 1/2009 | Bacher et al. |
| 2009/0039542 A1 | 2/2009 | Morton-Finger |
| 2009/0270564 A1 | 10/2009 | Gorlier et al. |
| 2009/0286919 A1 | 11/2009 | Moeller et al. |
| 2010/0102475 A1 | 4/2010 | Moon et al. |
| 2010/0113626 A1 | 5/2010 | Liu |
| 2010/0152309 A1* | 6/2010 | Booth ...................... D01F 6/62 521/40.5 |
| 2011/0177283 A1 | 7/2011 | Juriga |
| 2011/0257345 A1 | 10/2011 | Hoover, Jr. et al. |
| 2012/0070615 A1 | 3/2012 | Shi et al. |
| 2012/0279021 A1 | 11/2012 | Burout et al. |
| 2013/0133697 A1 | 5/2013 | Stockman et al. |
| 2015/0069652 A1 | 3/2015 | Clark |
| 2015/0069655 A1 | 3/2015 | Clark |
| 2015/0076725 A1 | 3/2015 | Clark |
| 2015/0076744 A1 | 3/2015 | Clark |
| 2017/0136761 A1 | 5/2017 | Sieradzki et al. |
| 2017/0152611 A1 | 6/2017 | Clark |
| 2017/0275785 A1 | 9/2017 | Williams et al. |
| 2018/0126595 A1 | 5/2018 | Clark |
| 2018/0127893 A1 | 5/2018 | Clark |
| 2018/0362723 A1 | 12/2018 | Gneuss et al. |
| 2020/0055213 A1 | 2/2020 | Clark |

FOREIGN PATENT DOCUMENTS

| | | |
|---|---|---|
| CH | 170967 A | 8/1934 |
| CN | 1391511 | 1/2003 |
| CN | 101444954 | 6/2009 |
| CN | 101778705 | 7/2010 |
| CN | 201872322 | 6/2011 |
| CN | 202072825 | 12/2011 |
| CN | 102990903 | 3/2013 |
| CN | 202986059 U | 6/2013 |
| CN | 104040040 | 9/2014 |
| CN | 204265905 | 4/2015 |
| DE | 2243024 A1 | 3/1973 |
| DE | 3801574 | 8/1989 |
| DE | 4433593 | 6/1995 |
| DE | 19722278 | 12/1998 |
| DE | 102006033089 | 10/2007 |
| DE | 102008018686 | 10/2009 |
| DE | 102011082769 | 3/2013 |
| DE | 102013000316 | 7/2014 |
| DE | 102017111275 | 11/2018 |
| EP | 0336520 | 10/1989 |
| EP | 0846860 A2 | 6/1998 |
| EP | 0881054 | 12/1998 |
| EP | 1054083 | 11/2000 |
| EP | 1400332 | 3/2004 |
| EP | 1434680 B1 | 7/2006 |
| EP | 2748358 | 7/2014 |
| EP | 3375916 | 9/2018 |
| GB | 2059864 | 4/1981 |
| GB | 1601699 | 11/1981 |
| GB | 2141844 | 1/1985 |
| JP | 63191823 | 8/1988 |
| JP | 2003530478 | 10/2003 |
| JP | 2007186830 | 7/2007 |
| WO | 2001021373 | 3/2001 |
| WO | 2002038276 | 5/2002 |
| WO | 2003033240 | 4/2003 |
| WO | 2004/026557 | 4/2004 |
| WO | 2008017843 | 2/2008 |
| WO | 2008083035 | 7/2008 |
| WO | 2008083820 | 7/2008 |
| WO | 2010133531 | 11/2010 |
| WO | 2011088437 | 7/2011 |
| WO | 2011095361 | 8/2011 |
| WO | 2012119165 | 9/2012 |
| WO | 2013180941 | 12/2013 |
| WO | 2016081474 | 5/2016 |
| WO | 2016081495 | 5/2016 |
| WO | 2016081508 | 5/2016 |

(56) References Cited

FOREIGN PATENT DOCUMENTS

| WO | 2016081568 | 5/2016 |
|---|---|---|
| WO | 2018089346 | 5/2018 |
| WO | 2018140884 | 8/2018 |
| WO | 2018161021 | 9/2018 |

OTHER PUBLICATIONS

Restriction Requirement, dated Jul. 1, 2020, from corresponding U.S. Appl. No. 16/041,586.
Office Action, dated Dec. 17, 2020, from corresponding U.S. Appl. No. 15/910,853.
Final Office Action, dated Dec. 31, 2020, from corresponding U.S. Appl. No. 16/348,117.
Office Action, dated Jan. 8, 2021, from corresponding U.S. Appl. No. 16/557,076.
Notice of Allowance, dated Jan. 13, 2021, from corresponding U.S. Appl. No. 16/537,844.
Office Action, dated Oct. 27, 2020, from corresponding U.S. Appl. No. 16/409,599.
Restriction Requirement, dated Oct. 20, 2020, from corresponding U.S. Appl. No. 16/480,302.
Office Action, dated Jun. 25, 2021, from corresponding U.S. Appl. No. 16/489,875.
Office Action, dated Jun. 25, 2021, from corresponding U.S. Appl. No. 16/816,409.
Final Office Action, dated Jul. 30, 2021, from corresponding U.S. Appl. No. 15/910,853.
Office Action, dated Aug. 6, 2021, from corresponding U.S. Appl. No. 16/518,261.
Notice of Allowance, dated Apr. 29, 2020, from corresponding U.S. Appl. No. 15/348,591.
Office Action, dated May 27, 2020, from corresponding U.S. Appl. No. 16/131,397.
International Preliminary Report on Patentability, dated Feb. 4, 2021, from corresponding International Application No. PCT/US2019/042456.
International Preliminary Report on Patentability, dated Feb. 4, 2021, from corresponding International Application No. PCT/US2019/042458.
Office Action, dated Feb. 12, 2021, from corresponding U.S. Appl. No. 16/480,302.
Notice of Allowance, dated Feb. 25, 2021, from corresponding U.S. Appl. No. 16/664,724.
Office Action, dated Mar. 1, 2021, from corresponding U.S. Appl. No. 16/131,397.
Final Office Action, dated Jun. 11, 2020, from corresponding U.S. Appl. No. 15/804,501.
Final Office Action, dated Jun. 11, 2020, from corresponding U.S. Appl. No. 16/409,599.
Gneuss website, https://www.gneuss.com/en/polymer-technologies/extrusion/mrs-extruder/, dated Jun. 5, 2020, pp. 1-4.
Final Office Action, dated Jun. 15, 2020, from corresponding U.S. Appl. No. 16/557,076.
Office Action, dated Jun. 24, 2020, from corresponding U.S. Appl. No. 16/348,117.
Office Action, dated Nov. 2, 2020, from corresponding U.S. Appl. No. 15/804,501.
Office Action, dated Nov. 18, 2020, from corresponding U.S. Appl. No. 16/664,724.
Final Office Action, dated Sep. 14, 2021, from corresponding U.S. Appl. No. 16/409,599.
Final Office Action, dated Sep. 7, 2021, from corresponding U.S. Appl. No. 16/131,397.
Notice of Allowance, dated Sep. 22, 2021, from corresponding U.S. Appl. No. 16/514,903.
Office Action, dated Sep. 2, 2021, from corresponding U.S. Appl. No. 16/645,137.
Final Office Action, dated Oct. 4, 2021, from corresponding U.S. Appl. No. 16/480,302.
Office Action, dated Oct. 6, 2021, from corresponding U.S. Appl. No. 16/489,875.
"MRS extrusion technology offers new options in PET", Plastics Additives and Compounding, Elsevier Science, Oxofrd, GB, vol. 11, No. 2, Mar. 1, 2009 (Mar. 1, 2009), pp. 24-26, XP026067788, ISSN: 1464-391X. DOI:10.1016/S1464-391X(09)70050-9 [retrieved on Mar. 1, 2009] the whole document.
"Processing Technology: Processing of Polymer Melts," Oct. 31, 2007, Gneuss Kunststofftechnik GmbH, Dusseldorf, Germany.
Australian Office Action, dated Aug. 26, 2015, from corresponding Australian Patent Application No. 2014215998.
Australian Office Action, dated Dec. 5, 2016, from corresponding Australian Patent Application No. 2016234917.
Australian Office Action, dated May 9, 2014, from corresponding Australian Patent Application No. 2013267847.
Austrian Patent Application No. A 330/2011, filed Mar. 10, 2011, entitled "Verfahren und Vorrichtung zum Entfernen von Verunreinigungen aus einer Kunststoffschmelze".
Botos, J., et al., "Color Measurement of Plastics—from Compounding via Pelletizing, up to Injection Molding and Extrusion," AIP Conference Proceedings 1593, 16 (2014), https://doi.org/10.1063/1.4873725, Feb. 17, 2015.
Chinese Office Action, dated May 12, 2016, from corresponding Chinese Patent Application No. 201380003461.8.
Chinese Office Action, dated Sep. 14, 2015, from corresponding Chinese Patent Application No. 201380003461.8.
Decision of Patent Grant, dated Dec. 12, 2014, from corresponding Korean Patent Application No. 10-2014-7016621.
European Office Action, dated Dec. 12, 2016, from corresponding European Patent Application No. 15158377.0.
Ex Parte Quayle Action, dated Mar. 11, 2019, from corresponding U.S. Appl. No. 16/220,733.
Extended European Search Report, dated Aug. 26, 2015, from corresponding European Application No. 15158377.0.
Extended European Search Report, dated Jul. 24, 2018, from corresponding European Patent Application No. 18170112.9.
Final Office Action, dated Dec. 24, 2015, from corresponding U.S. Appl. No. 14/256,261.
Final Office Action, dated Jan. 9, 2020, from corresponding U.S. Appl. No. 15/348,591.
Final Office Action, dated May 22, 2019, from corresponding U.S. Appl. No. 15/396,143.
Final Office Action, dated Oct. 19, 2016, from corresponding U.S. Appl. No. 14/546,819.
Final Office Action, dated Oct. 19, 2016, from corresponding U.S. Appl. No. 14/546,837.
Final Office Action, dated Oct. 19, 2016, from corresponding U.S. Appl. No. 14/546,847.
Final Office Action, dated Oct. 20, 2016, from corresponding U.S. Appl. No. 14/546,796.
Gneuss M: "Multi Rotation System Extruder Leads To Breakthrough in Polymer Evacuation", International Fiber Journal, International Media Group, Charlotte, NC, US, vol. 23, No. 1, Feb. 1, 2008 (Feb. 1, 2008), pp. 40-41, XP001514827, ISSN: 1049-801X the whole document.
Hannemann, Innovative Aufbereitungslösung für PET mit uneingeschränkter FDA—Lebensmittelzulassung, Presentation, Mar. 15, 2012, 37 pages total, Gneuss Kunststofftechnik GmbH, Germany.
International Preliminary Report on Patentability, dated Aug. 8, 2019, from corresponding International Application No. PCT/US2018/015751.
International Preliminary Report on Patentability, dated Dec. 11, 2014, from corresponding International Application No. PCT/US2013/040753.
International Preliminary Report on Patentability, dated Dec. 2, 2014, from corresponding International Application No. PCT/US2013/040753.
International Preliminary Report on Patentability, dated Jun. 1, 2017, from corresponding International Application No. PCT/US2015/061116.

(56) References Cited

OTHER PUBLICATIONS

International Preliminary Report on Patentability, dated Jun. 1, 2017, from corresponding International Application No. PCT/US2015/061145.
International Preliminary Report on Patentability, dated Jun. 1, 2017, from corresponding International Application No. PCT/US2015/061174.
International Preliminary Report on Patentability, dated Jun. 1, 2017, from corresponding International Application No. PCT/US2015/061288.
International Preliminary Report on Patentability, dated Mar. 26, 2020, from corresponding International Application No. PCT/US2018/051043.
International Preliminary Report on Patentability, dated Sep. 12, 2019, from corresponding International Application No. PCT/US2018/020746.
International Search Report, dated Apr. 12, 2018, from corresponding International Application No. PCT/US2018/015751.
International Search Report, dated Dec. 10, 2019, from corresponding International Application No. PCT/US2019/042458.
International Search Report, dated Feb. 2, 2016, from corresponding International Application No. PCT/US2015/061116.
International Search Report, dated Feb. 2, 2016, from corresponding International Application No. PCT/US2015/061145.
International Search Report, dated Feb. 5, 2016, from corresponding International Application No. PCT/US2015/061174.
International Search Report, dated Jan. 20, 2016, from corresponding International Application No. PCT/US2015/061288.
International Search Report, dated Jul. 5, 2012, from corresponding International Application No. PCT/AT2012/000052.
International Search Report, dated Mar. 1, 2018, from corresponding International Application Serial No. PCT/US2017/060359.
International Search Report, dated Nov. 19, 2018, from corresponding International Application No. PCT/US2018/051043.
International Search Report, dated Oct. 30, 2019, from corresponding International Application No. PCT/US2019/042456.
International Search Report, dated Sep. 2, 2013, from corresponding International Application No. PCT/US2013/040753.
Invitation to Pay Additional Fees, dated Oct. 18, 2019, from corresponding International Application No. PCT/US2019/042458.
Invitation to Pay Additional Search Fees, dated Jan. 5, 2018, from corresponding International Application Serial No. PCT/US2017/060359.
Jaecker M: "The Conceptual Concept of the Future // Advantages of the Negative-Conical Gangti EFE on Double-Screw Extruders", Kunststoffe, Carl Hanser Verlag, Munchen, DE, vol. 99, No. 12, Dec. 1, 2000 (Dec. 91, 2000), p. 64,66, XP990976191, ISSN: 9923-5563, figure 1.
Korean Office Action, dated Aug. 18, 2014, from corresponding Korean Patent Application No. 10-2014-7016621.
Machado, Almir De Souza, "Fundamentals of Cast Film Extrusion Technology," https://www.slideshare.net/ASMachado/fundamentals-of-cast-film-extrusion-technology, Dec. 2, 2013.
Notice of Acceptance, dated Jun. 21, 2016, from corresponding Australian Patent Application No. 2014215998.
Notice of Acceptance, dated Nov. 10, 2014, from corresponding Australian Patent Application No. 2013267847.
International Search Report, dated Sep. 3, 2020, from corresponding International Application No. PCT/US2020/036094.
Written Opinion of the International Searching Authority, dated Sep. 3, 2020, from corresponding International Application No. PCT/US2020/036094.
Office Action, dated Sep. 1, 2020, from corresponding U.S. Appl. No. 16/537,844.
Wikipedia, Polyethylene terephthalate, https://en.wikipedia.org/w/index.php?title=Polyethylene_terephthalate&oldid=491494734.
Written Opinion of the International Searching Authority, dated Apr. 12, 2018, from corresponding International Application No. PCT/US2018/015751.

Written Opinion of the International Searching Authority, dated Dec. 10, 2019, from corresponding International Application No. PCT/US2019/042458.
Written Opinion of the International Searching Authority, dated Feb. 2, 2016, from corresponding International Application No. PCT/US2015/061116.
Written Opinion of the International Searching Authority, dated Feb. 2, 2016, from corresponding International Application No. PCT/US2015/061145.
Written Opinion of the International Searching Authority, dated Feb. 5, 2016, from corresponding International Application No. PCT/US2015/061174.
Written Opinion of the International Searching Authority, dated Jan. 20, 2016, from corresponding International Application No. PCT/US2015/061288.
Written Opinion of the International Searching Authority, dated Mar. 1, 2018, from corresponding International Application Serial No. PCT/US2017/060359.
Written Opinion of the International Searching Authority, dated Nov. 19, 2018, from corresponding International Application No. PCT/US2018/051043.
Written Opinion of the International Searching Authority, dated Oct. 30, 2019, from corresponding International Application No. PCT/US2019/042456.
Written Opinion of the International Searching Authority, dated Sep. 2, 2013, from corresponding International Application No. PCT/US2013/040753.
Notice of Allowance, dated Apr. 9, 2020, from corresponding U.S. Appl. No. 16/684,490.
Advisory Action, dated Apr. 9, 2021, from corresponding U.S. Appl. No. 16/348,117.
Final Office Action, dated Apr. 27, 2021, from corresponding U.S. Appl. No. 15/910,853.
Office Action, dated May 4, 2021, from corresponding U.S. Appl. No. 16/409,599.
Restriction Requirement, dated May 17, 2021, from corresponding U.S. Appl. No. 16/514,898.
Final Office Action, dated May 25, 2021, from corresponding U.S. Appl. No. 16/480,302.
Notice of Allowance, dated Jun. 23, 2021, from corresponding U.S. Appl. No. 16/557,076.
Office Action, dated Jun. 18, 2021, from corresponding U.S. Appl. No. 16/348,117.
Office Action, dated Jun. 2, 2021, from corresponding U.S. Appl. No. 16/514,903.
Notice of Allowance, dated Apr. 13, 2016, from corresponding U.S. Appl. No. 14/256,261.
Notice of Allowance, dated Apr. 17, 2019, from corresponding U.S. Appl. No. 16/220,733.
Notice of Allowance, dated Aug. 1, 2019, from corresponding U.S. Appl. No. 15/396,143.
Notice of Allowance, dated Aug. 19, 2019, from corresponding U.S. Appl. No. 16/402,583.
Notice of Allowance, dated Dec. 13, 2018, from corresponding U.S. Appl. No. 15/473,385.
Notice of Allowance, dated Feb. 12, 2020, from corresponding U.S. Appl. No. 16/220,905.
Notice of Allowance, dated Feb. 2, 2017, from corresponding U.S. Appl. No. 14/546,819.
Notice of Allowance, dated Feb. 2, 2017, from corresponding U.S. Appl. No. 14/546,837.
Notice of Allowance, dated Feb. 2, 2017, from corresponding U.S. Appl. No. 14/546,847.
Notice of Allowance, dated Feb. 28, 2020, from corresponding U.S. Appl. No. 16/664,730.
Notice of Allowance, dated Feb. 3, 2017, from corresponding U.S. Appl. No. 14/546,796.
Notice of Allowance, dated Feb. 3, 2020, from corresponding U.S. Appl. No. 16/041,442.
Notice of Allowance, dated Jan. 24, 2019, from corresponding U.S. Appl. No. 15/473,402.
Notice of Allowance, dated Jul. 5, 2018, from corresponding U.S. Appl. No. 15/204,645.

(56) References Cited

OTHER PUBLICATIONS

Notice of Allowance, dated Mar. 3, 2020, from corresponding U.S. Appl. No. 16/213,694.
Notice of Allowance, dated May 1, 2019, from corresponding U.S. Appl. No. 15/419,955.
Notice of Allowance, dated Oct. 10, 2019, from corresponding U.S. Appl. No. 16/432,579.
Notice of Allowance, dated Oct. 28, 2013, from corresponding U.S. Appl. No. 13/721,955.
Notice of Allowance, dated Sep. 12, 2016, from corresponding U.S. Appl. No. 13/892,713.
Notice of Opposition, dated Dec. 17, 2015, from corresponding European Application No. 13728264.6.
Office Action, dated Apr. 9, 2018, from corresponding U.S. Appl. No. 15/204,645.
Office Action, dated Aug. 13, 2019, from corresponding U.S. Appl. No. 16/213,694.
Office Action, dated Aug. 21, 2015, from corresponding U.S. Appl. No. 14/256,261.
Office Action, dated Aug. 26, 2019, from corresponding U.S. Appl. No. 16/220,905.
Office Action, dated Aug. 27, 2018, from corresponding U.S. Appl. No. 15/473,385.
Office Action, dated Aug. 27, 2018, from corresponding U.S. Appl. No. 15/473,402.
Office Action, dated Aug. 8, 2019, from corresponding U.S. Appl. No. 16/409,599.
Office Action, dated Dec. 2, 2019, from corresponding U.S. Appl. No. 16/664,730.
Office Action, dated Feb. 21, 2020, from corresponding U.S. Appl. No. 15/910,853.
Office Action, dated Jan. 29, 2020, from corresponding U.S. Appl. No. 16/684,490.
Office Action, dated Jul. 23, 2019, from corresponding U.S. Appl. No. 16/041,442.
Office Action, dated Jun. 1, 2016, from corresponding U.S. Appl. No. 14/546,837.
Office Action, dated Jun. 10, 2013, from corresponding U.S. Appl. No. 13/721,955.
Office Action, dated Jun. 13, 2016, from corresponding U.S. Appl. No. 14/546,847.
Office Action, dated Jun. 18, 2019, from corresponding U.S. Appl. No. 16/402,583.
Office Action, dated Jun. 22, 2016, from corresponding U.S. Appl. No. 14/546,796.
Office Action, dated Jun. 30, 2016, from corresponding U.S. Appl. No. 13/892,740.
Office Action, dated Mar. 24, 2016, from corresponding U.S. Appl. No. 13/892,713.
Office Action, dated May 26, 2016, from corresponding U.S. Appl. No. 14/546,819.
Office Action, dated May 6, 2019, from corresponding U.S. Appl. No. 15/348,591.
Office Action, dated Nov. 25, 2019, from corresponding U.S. Appl. No. 15/804,501.
Office Action, dated Nov. 29, 2019, from corresponding U.S. Appl. No. 16/557,076.
Office Action, dated Oct. 9, 2018, from corresponding U.S. Appl. No. 15/419,955.
Office Action, dated Sep. 12, 2019, from corresponding U.S. Appl. No. 16/432,579.
Office Action, dated Sep. 7, 2018, from corresponding U.S. Appl. No. 15/396,143.
Restriction Requirement, dated Apr. 30, 2013, from corresponding U.S. Appl. No. 13/721,955.
Restriction Requirement, dated Feb. 5, 2019, from corresponding U.S. Appl. No. 16/220,733.
Restriction Requirement, dated Jul. 15, 2019, from corresponding U.S. Appl. No. 16/432,579.
Schieffer,Process Engineering, Rowohlt Taschenbuch Verlag GmbH, Aug. 1972.
Vietnamese Office Action, dated Jul. 13, 2016, from corresponding Vietnamese Patent Application No. 1-2014-01079.
European Search Report, dated Apr. 28, 2020, from corresponding European Application No. 17869117.6.
Final Office Action, dated Sep. 28, 2020, from corresponding U.S. Appl. No. 16/131,397.
Notice of Allowance, dated Feb. 2, 2022, from corresponding U.S. Appl. No. 16/480,302.
Notice of Allowance, dated Nov. 26, 2021, from corresponding U.S. Appl. No. 16/518,261.
Notice of Allowance, dated Nov. 4, 2021, from corresponding U.S. Appl. No. 16/816,409.
Office Action, dated Jan. 18, 2022, from corresponding U.S. Appl. No. 16/409,599.
Office Action, dated Jan. 7, 2022, from corresponding U.S. Appl. No. 16/866,702.
Notice of Allowance, dated Apr. 27, 2022, from corresponding U.S. Appl. No. 16/866,702.
Final Office Action, dated Jun. 8, 2022, from corresponding U.S. Appl. No. 16/409,599.

* cited by examiner

METHODS FOR MANUFACTURING BULKED CONTINUOUS FILAMENT

CROSS REFERENCE TO RELATED APPLICATIONS

This application is a continuation of U.S. patent application Ser. No. 16/220,905, filed Dec. 14, 2018, now U.S. Pat. No. 10,654,211, issued May 19, 2020, entitled "Methods for Manufacturing Bulked Continuous Filament," which is a continuation of U.S. patent application Ser. No. 15/473,402, filed Mar. 29, 2017, now U.S. Pat. No. 10,232,542, issued Mar. 19, 2019, entitled "Methods for Manufacturing Bulked Continuous Filament," which is a continuation of U.S. patent application Ser. No. 14/546,819, filed Nov. 18, 2014, now U.S. Pat. No. 9,630,353, issued Apr. 25, 2017, entitled "Methods for Manufacturing Bulked Continuous Filament," which is a continuation-in-part of U.S. patent application Ser. No. 13/892,740, filed May 13, 2013, now abandoned, entitled "Systems and Methods for Manufacturing Bulked Continuous Filament," which is a divisional of U.S. patent application Ser. No. 13/721,955, filed Dec. 20, 2012, now U.S. Pat. No. 8,597,553, issued Dec. 3, 2013, entitled "Systems and Methods for Manufacturing Bulked Continuous Filament," which claimed the benefit of U.S. Provisional Patent Application Ser. No. 61/654,016, filed May 31, 2012, entitled "Systems and Methods for Manufacturing Bulked Continuous Fiber," all of which are hereby incorporated herein by reference in their entirety.

BACKGROUND

Because pure virgin PET polymer is more expensive than recycled PET polymer, and because of the environmental benefits associated with using recycled polymer, it would be desirable to be able to produce bulked continuous carpet filament from 100% recycled PET polymer (e.g., PET polymer from post-consumer PET bottles).

SUMMARY

A method of manufacturing bulked continuous carpet filament, according to various embodiments, comprises: (A) providing a first extruder comprising a first extruder inlet, a first extruder outlet and a pressure regulation system that is adapted to maintain a pressure within the first extruder below about 25 millibars; (B) using the pressure regulation system to reduce a pressure within the first extruder to below about 25 millibars; (C) while maintaining the pressure within the first extruder below about 25 millibars, passing a plurality of flakes of recycled PET through the first extruder via the first extruder inlet to at least partially melt the plurality of flakes into a polymer melt; (D) providing at least one spinning machine comprising at least one spinning machine inlet, wherein the at least one spinning machine inlet is substantially directly coupled to the first extruder outlet; (E) after the step of passing the polymer melt through the first extruder, substantially immediately forming the polymer melt into bulked continuous carpet filament using the at least one spinning machine.

A method of manufacturing bulked continuous carpet filament, according to various embodiments: (A) providing an expanded surface area extruder, wherein the expanded surface area extruder defines an expanded surface area extruder inlet and an expanded surface area extruder outlet; (B) providing a pressure regulation system configured to reduce a pressure within at least a portion of the expanded surface area extruder below about 12 mbar; (C) providing a spinning machine defining a spinning machine inlet, wherein the spinning machine inlet is operatively coupled to the expanded surface area extruder outlet; (D) using the pressure regulation system to reduce the pressure within the at least a portion of the expanded surface area extruder below about 12 mbar; (E) passing a plurality of flakes consisting essentially of PET flakes through the expanded surface area extruder via the expanded surface area extruder inlet to at least partially melt the plurality of flakes to form a polymer melt; and (F) substantially immediately after passing the plurality of flakes through the expanded surface area extruder, using the spinning machine to form the polymer melt into bulked continuous carpet filament.

A method of manufacturing carpet filament, in particular embodiments, comprises the steps of: (A) grinding a plurality of recycled PET bottles into a group of polymer flakes; (B) washing the group of polymer flakes to remove at least a portion of one or more contaminants from a surface of the flakes, the group of flakes comprising a first plurality of flakes that consist essentially of PET and a second plurality of flakes that do not consist essentially of PET; (C) after the step of washing the first plurality of flakes: (i) scanning the washed group of flakes to identify the second plurality of flakes, and (ii) separating the second plurality of flakes from the first plurality of flakes; (D) providing an expanded surface area extruder having an extruder inlet and an extruder outlet; (E) providing a pressure regulation system configured to reduce a pressure within the expanded surface area extruder between about 0 mbar and about 25 mbar; (F) providing a spinning machine having a spinning machine inlet, wherein the spinning machine inlet is directly coupled to the extruder outlet; (G) using the pressure regulation system to reduce the pressure within the expanded surface area extruder between about 0 mbar and about 5 mbar; (H) while maintaining the pressure within the expanded surface area extruder between about 0 mbar about 5 mbar, passing the second plurality of flakes through the expanded surface area extruder via the first inlet; (I) melting the second plurality of flakes using the expanded surface area extruder to produce a polymer melt; and (J) substantially immediately after passing the second plurality of flakes through the expanded surface area extruder, spinning the polymer melt into bulked continuous carpet filament using the spinning machine.

Various embodiments are also described in the following listing of concepts:

1. A method of manufacturing bulked continuous carpet filament, the method comprising:

(A) washing a plurality of flakes comprising recycled PET;

(B) providing a PET crystallizer;

(C) after the step of washing the plurality of flakes comprising recycled PET, passing at least a portion of the plurality of flakes comprising recycled PET through the PET crystallizer;

(D) providing an expanded surface area extruder, wherein the expanded surface area extruder defines an expanded surface area extruder inlet and an expanded surface area extruder outlet;

(E) providing a pressure regulation system configured to reduce a pressure within at least a portion of the expanded surface area extruder;

(F) providing a spinning machine defining a spinning machine inlet, wherein the spinning machine inlet is operatively coupled to the expanded surface area extruder outlet;

(G) using the pressure regulation system to reduce the pressure within the at least a portion of the expanded surface area extruder;

(H) after passing the plurality of flakes comprising recycled PET through the PET crystallizer, passing the plurality of flakes comprising recycled PET through the expanded surface area extruder via the expanded surface area extruder inlet to at least partially melt the plurality of flakes to form a polymer melt; and (I) substantially immediately after passing the plurality of flakes through the expanded surface area extruder, using the spinning machine to form the polymer melt into bulked continuous carpet filament.

2. The method of concept 1, wherein the expanded surface area extruder is configured to increase a surface area of the polymer melt as the polymer melt passes through the expanded surface area extruder utilizing at least eight different streams of polymer melt.

3. The method of concept 2, wherein the method further comprises exposing the at least eight different streams of polymer melt to the pressure within the at least the portion of the expanded surface area extruder.

4. The method of concept 3, wherein using the pressure regulation system to reduce the pressure within the at least the portion of the expanded surface area extruder comprises reducing the pressure to below about 25 millibar.

5. The method of concept 1, wherein the PET crystallizer comprises:

one or more heating elements configured to raise a temperature within the PET crystallizer; and one or more blowers configured to blow air that has been at least partially heated by the one or more heating elements over the plurality of flakes comprising recycled PET as the plurality of flakes pass through the PET crystallizer.

6. The method of concept 5, wherein the one or more blowers are configured to blow the air from a bottom portion of the PET crystallizer.

7. The method of concept 5, wherein the PET crystallizer is configured to at least partially dry a surface of the plurality of flakes comprising recycled PET.

8. The method of concept 7, wherein the PET crystallizer is configured to reduce a moisture content of the plurality of flakes comprising recycled PET to below about 50 ppm.

9. A method for manufacturing bulked continuous carpet filament, according to any embodiment described herein, may comprise:

providing a crystallizer;

providing an extruder, wherein the extruder comprises a chamber and defines an extruder inlet and an extruder outlet;

providing a pressure regulation system configured to reduce a pressure within the chamber;

providing a spinning machine defining a spinning machine inlet, wherein the spinning machine inlet is operatively coupled to the extruder outlet;

using the pressure regulation system to reduce the pressure within the chamber;

passing a plurality of polymer flakes through the crystallizer;

after passing the plurality of polymer flakes through the crystallizer, melting the plurality of polymer flakes to create a polymer melt;

using the extruder to separate the polymer melt into a plurality of different streams, the plurality of different streams comprising at least eight streams of the polymer melt;

exposing each of the at least eight streams of the polymer melt to the pressure while the at least eight streams of the polymer melt are in the chamber;

after exposing the at least eight streams of the polymer melt to the pressure, recombining the at least eight streams into a single polymer stream; and substantially immediately after recombining the at least eight streams into the single polymer stream, using the spinning machine to form polymer from the single polymer stream into bulked continuous carpet filament.

10. The method of concept 9, wherein using the spinning machine to form polymer from the single polymer stream into bulked continuous carpet filament substantially immediately after recombining the at least eight streams into the single polymer stream comprises passing the single polymer stream directly to the spinning machine inlet via the extruder outlet.

11. The method of concept 9, wherein using the pressure regulation system to reduce the pressure within the chamber comprises reducing the pressure within the chamber to below about 25 millibar.

12. The method of concept 9, wherein the crystallizer comprises:

one or more heating elements configured to raise a temperature within the crystallizer; and one or more blowers configured to blow air that has been at least partially heated by the one or more heating elements over the plurality of polymer flakes as the plurality of polymer flakes pass through the crystallizer.

13. The method of concept 12, wherein the one or more blowers are configured to blow the air from a bottom portion of the crystallizer.

14. The method of concept 13, wherein the crystallizer is configured to at least partially dry a surface of the plurality of polymer flakes.

15. The method of Claim 14, wherein the crystallizer is configured to reduce a moisture content of the plurality of polymer flakes to below about 50 ppm.

16. The method of concept 12, wherein the crystallizer comprises a stirring apparatus configured to stir the plurality of polymer flakes as the plurality of polymer flakes pass through the crystallizer.

17. The method of concept 9, wherein the method further comprises, prior to passing the plurality of polymer flakes through the crystallizer, washing the plurality of polymer flakes to remove at least a portion of one or more contaminants from the surface of the plurality of polymer flakes.

18. A method of manufacturing bulked continuous carpet filament, in particular embodiments, comprises:

(A) providing a PET crystallizer;

(B) passing at least a portion of the plurality of flakes comprising recycled PET through the PET crystallizer to at least partially dry a surface of the plurality of flakes comprising recycled PET;

(C) providing an expanded surface area extruder, wherein the expanded surface area extruder defines an expanded surface area extruder inlet and an expanded surface area extruder outlet;

(D) providing a pressure regulation system configured to reduce a pressure within at least a portion of the expanded surface area extruder below about 25 mbar;

(E) providing a spinning machine defining a spinning machine inlet, wherein the spinning machine inlet is operatively coupled to the expanded surface area extruder outlet;

(F) using the pressure regulation system to reduce the pressure within the at least a portion of the expanded surface area extruder below about 25 mbar;

(G) after passing the plurality of flakes comprising recycled PET through the PET crystallizer, passing the plurality of flakes comprising PET flakes through the expanded surface area extruder via the expanded surface area extruder inlet to at least partially melt the plurality of flakes to form a polymer melt such that at least a portion of the polymer melt is exposed to the pressure within the at least a portion of the expanded surface area extruder; and (H) substantially immediately after passing the plurality of flakes through the expanded surface area extruder, using the spinning machine to form the polymer melt into bulked continuous carpet filament.

19. The method of concept 18, wherein the PET crystallizer is configured to reduce a moisture content of the plurality of polymer flakes to below about 50 ppm 20. The method of concept 18, wherein using the spinning machine to form the polymer melt into bulked continuous carpet filament substantially immediately after passing the plurality of flakes through the expanded surface area extruder comprises passing the polymer melt directly to the spinning machine inlet via the expanded surface area extruder outlet.

BRIEF DESCRIPTION OF THE DRAWINGS

Having described various embodiments in general terms, reference will now be made to the accompanying drawings, which are not necessarily drawn to scale, and wherein.

DETAILED DESCRIPTION OF VARIOUS EMBODIMENTS

Figure 1:
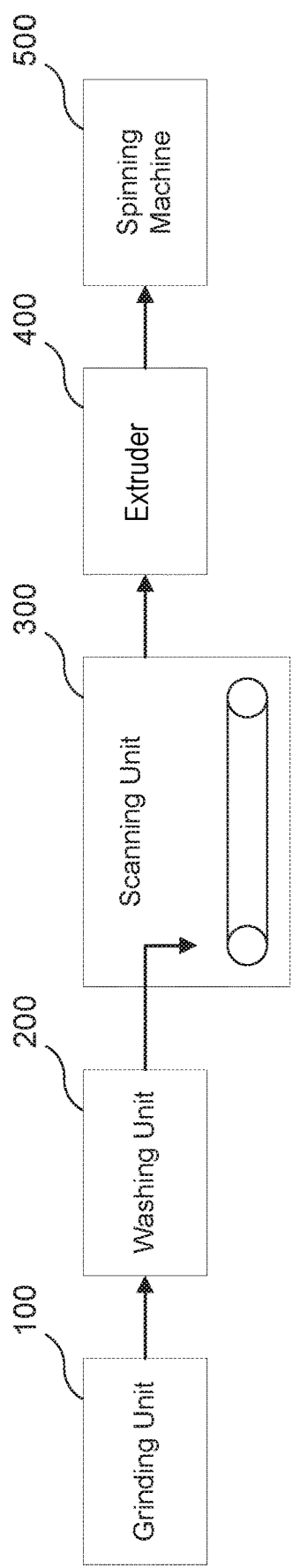
FIG. 1 depicts a process flow, according to a particular embodiment, for manufacturing bulked continuous carpet filament.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

I. Overview

New processes for making fiber from recycled polymer (e.g., recycled PET polymer) are described below. In various embodiments, this new process: (1) is more effective than earlier processes in removing contaminates and water from the recycled polymer; and/or (2) does not require the polymer to be melted and cooled as many times as in earlier processes. In at least one embodiment, the improved process results in a recycled PET polymer having a polymer quality that is high enough that the PET polymer may be used in producing bulked continuous carpet filament from 100% recycled PET content (e.g., 100% from PET obtained from previously used PET bottles). In particular embodiments, the recycled PET polymer has an intrinsic viscosity of at least about 0.79 dL/g (e.g., of between about 0.79 dL/g and about 1.00 dL/g).

II. More Detailed Discussion

A BCF (bulked continuous filament) manufacturing process, according to a particular embodiment, may generally be broken down into three steps: (1) preparing flakes of PET polymer from post-consumer bottles for use in the process; (2) passing the flakes through an extruder that melts the flakes and purifies the resulting PET polymer; and (3) feeding the purified polymer into a spinning machine that turns the polymer into filament for use in manufacturing carpets. These three steps are described in greater detail below.

STEP 1: Preparing Flakes of PET Polymer from Post-Consumer Bottles

In a particular embodiment, the step of preparing flakes of PET polymer from post-consumer bottles comprises: (A) sorting post-consumer PET bottles and grinding the bottles into flakes; (B) washing the flakes; and (C) identifying and removing any impurities or impure flakes.

A. Sorting Post-Consumer PET Bottles and Grinding the Bottles into Flakes

In particular embodiments, bales of clear and mixed colored recycled post-consumer (e.g., "curbside") PET bottles (or other containers) obtained from various recycling facilities make-up the post-consumer PET containers for use in the process. In other embodiments, the source of the post-consumer PET containers may be returned 'deposit' bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., PVC, PLA, PP, PE, PS, PA, etc.), metal (e.g., ferrous and non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the whole bottles via a rotating trammel. Various metal removal magnets and eddy current systems may be incorporated into the process to remove any metal contaminants. Near Infra-Red optical sorting equipment such as the NRT Multi Sort IR machine from Bulk Handling Systems Company of Eugene, Oreg., or the Spyder IR machine from National Recovery Technologies of Nashville, Tenn., may be utilized to remove any loose polymeric contaminants that may be mixed in with the PET flakes (e.g., PVC, PLA, PP, PE, PS, and PA). Additionally, automated X-ray sorting equipment such as a VINYL-CYCLE machine from National Recovery Technologies of Nashville, Tenn. may be utilized to remove remaining PVC contaminants.

In particular embodiments, a binary segregation of the clear materials from the colored materials is achieved using automated color sorting equipment equipped with a camera detection system (e.g., an Multisort ES machine from National Recovery Technologies of Nashville, Tenn.). In various embodiments, manual sorters are stationed at various points on the line to remove contaminants not removed by the sorter and any colored bottles. In particular embodiments, the sorted material is taken through a granulation step (e.g., using a 50B Granulator machine from Cumberland Engineering Corporation of New Berlin, Wis.) to size reduce (e.g., grind) the bottles down to a size of less than one half of an inch. In various embodiments, the bottle labels are removed from the resultant "dirty flake" (e.g., the PET flakes formed during the granulation step) via an air separation system prior to entering the wash process.

B. Washing the Flakes

In particular embodiments, the "dirty flake" is then mixed into a series of wash tanks. As part of the wash process, in various embodiments, an aqueous density separation is utilized to separate the olefin bottle caps (which may, for example, be present in the "dirty flake" as remnants from recycled PET bottles) from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the flake is centrifugally dewatered and then dried with hot air to at least substantially remove any surface moisture. The resultant "clean flake" is then processed through an electrostatic separation system (e.g., an electrostatic separator from Carpco, Inc. of Jacksonville, Fla.) and a flake metal detection system (e.g., an MSS Metal Sorting System) to further remove any metal contaminants that remain in the flake. In particular embodiments, an air separation step removes any remaining label from the clean flake. In various embodiments, the flake is then taken through a flake color sorting step (e.g., using an OPTIMIX machine from TSM Control Systems of Dundalk, Ireland) to remove any remaining color contaminants remaining in the flake. In various embodiments, an electro-optical flake sorter based at least in part on Raman technology (e.g., a Powersort 200 from Unisensor Sensorsysteme GmbH of Karlsruhe, Germany) performs the final polymer separation to remove any non-PET polymers remaining in the flake. This step may also further remove any remaining metal contaminants and color contaminants.

In various embodiments, the combination of these steps delivers substantially clean (e.g., clean) PET bottle flake comprising less than about 50 parts per million PVC (e.g., 25 ppm PVC) and less than about 15 parts per million metals for use in the downstream extrusion process described below.

C. Identifying and Removing Impurities and Impure Flakes

In particular embodiments, after the flakes are washed, they are fed down a conveyor and scanned with a high-speed laser system 300. In various embodiments, particular lasers that make up the high-speed laser system 300 are configured to detect the presence of particular contaminates (e.g., PVC or Aluminum). Flakes that are identified as not consisting essentially of PET may be blown from the main stream of flakes with air jets. In various embodiments, the resulting level of non-PET flakes is less than 25 ppm.

In various embodiments, the system is adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water remains within the flakes. In various embodiments, these "wet" flakes (e.g., flakes comprising interstitial water) may then be fed into an extruder (e.g., as described in Step 2 below), which includes a vacuum setup designed to remove—among other things—the interstitial water that remains present in the flakes following the quick-drying process described above.

STEP 2: Using an Extrusion System to Melt and Purify PET Flakes

Figure 2:
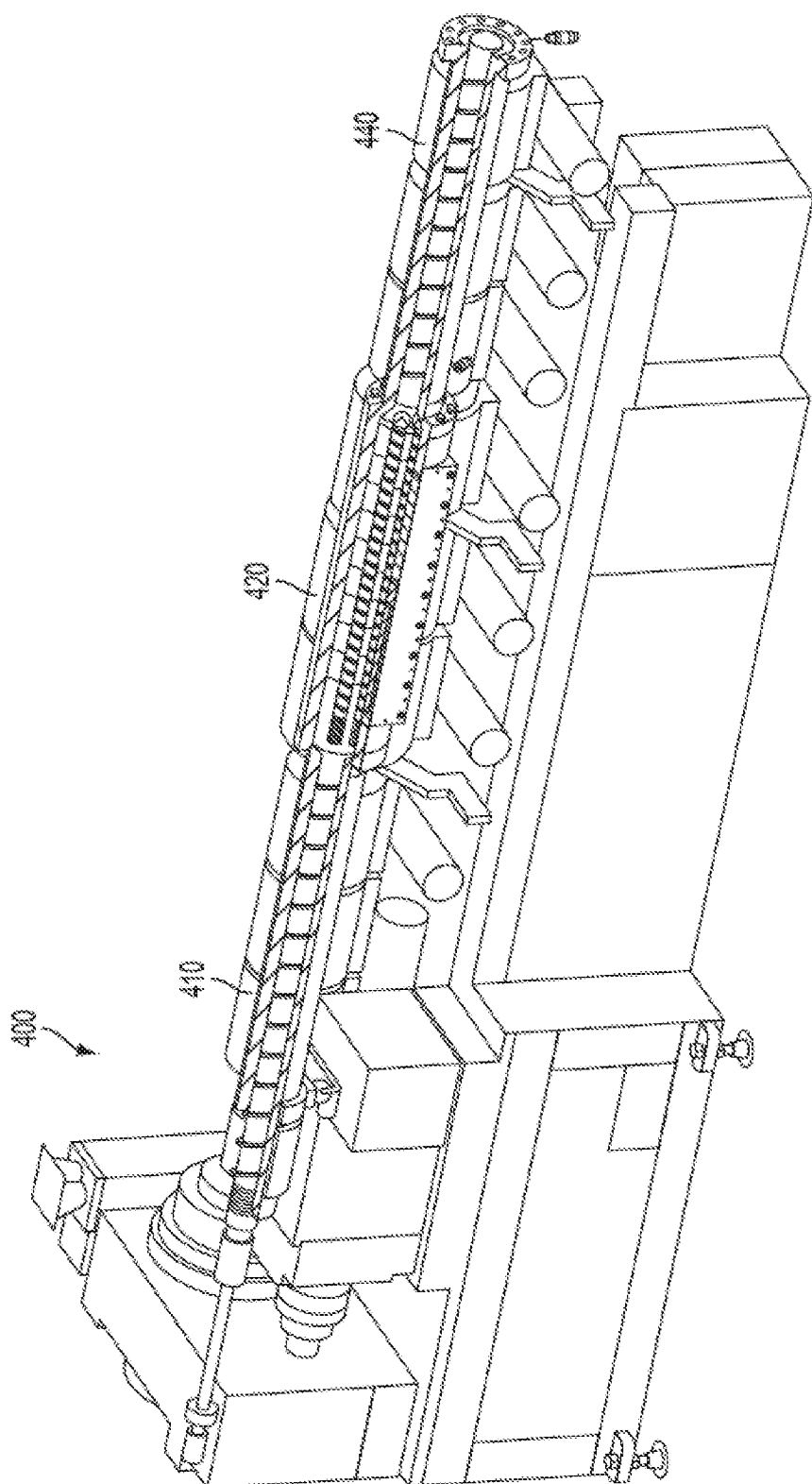
FIG. 2 is a perspective view of an MRS extruder that is suitable for use in the process of FIG. 1.
Figure 3:
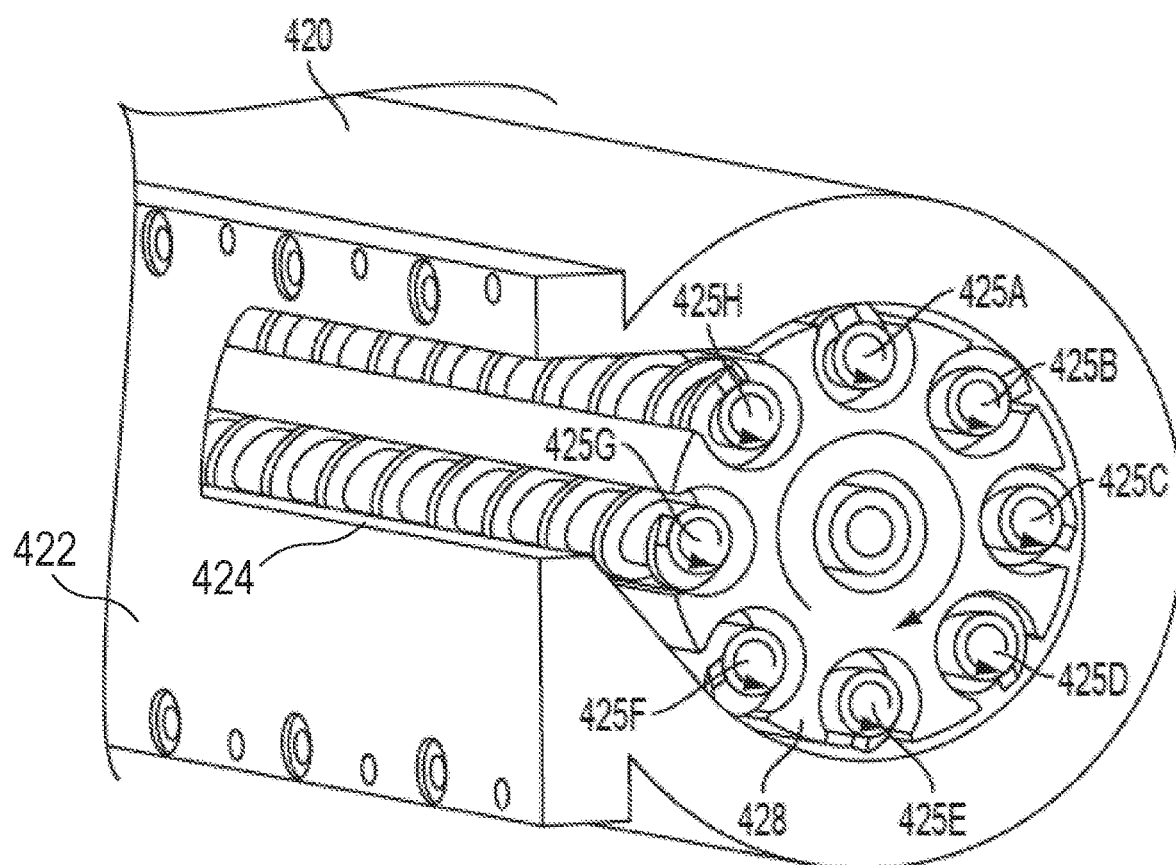
FIG. 3 is a cross-sectional view of an exemplary MRS section of the MRS extruder of FIG. 2.

In particular embodiments, an extruder is used to turn the wet flakes described above into a molten recycled PET polymer and to perform a number of purification processes to prepare the polymer to be turned into BCF for carpet. As noted above, in various embodiments, after STEP 1 is complete, the recycled PET polymer flakes are wet (e.g., surface water is substantially removed (e.g., fully removed) from the flakes, but interstitial water remains in the flakes). In particular embodiments, these wet flakes are fed into a Multiple Rotating Screw ("MRS") extruder 400. In other embodiments, the wet flakes are fed into any other suitable extruder (e.g., a twin screw extruder, a multiple screw extruder, a planetary extruder, or any other suitable extrusion system). An exemplary MRS Extruder 400 is shown in FIGS. 2 and 3. A particular example of such an MRS extruder is described in U.S. Published Patent Application 2005/0047267, entitled "Extruder for Producing Molten Plastic Materials", which was published on Mar. 3, 2005, and which is hereby incorporated herein by reference.

As may be understood from this figure, in particular embodiments, the MRS extruder includes a first single-screw extruder section 410 for feeding material into an MRS section 420 and a second single-screw extruder section 440 for transporting material away from the MRS section.

In various embodiments, the wet flakes are fed directly into the MRS extruder 400 substantially immediately (e.g., immediately) following the washing step described above (e.g., without drying the flakes or allowing the flakes to dry). In particular embodiments, a system that feeds the wet flakes directly into the MRS Extruder 400 substantially immediately (e.g., immediately) following the washing step described above may consume about 20% less energy than a system that substantially fully pre-dries the flakes before extrusion (e.g., a system that pre-dries the flakes by passing hot air over the wet flakes for a prolonged period of time). In various embodiments, a system that feeds the wet flakes directly into the MRS Extruder 400 substantially immediately (e.g., immediately) following the washing step described above avoids the need to wait a period of time (e.g., up to eight hours) generally required to fully dry the flakes (e.g., remove all of the surface and interstitial water from the flakes).

Figure 4:
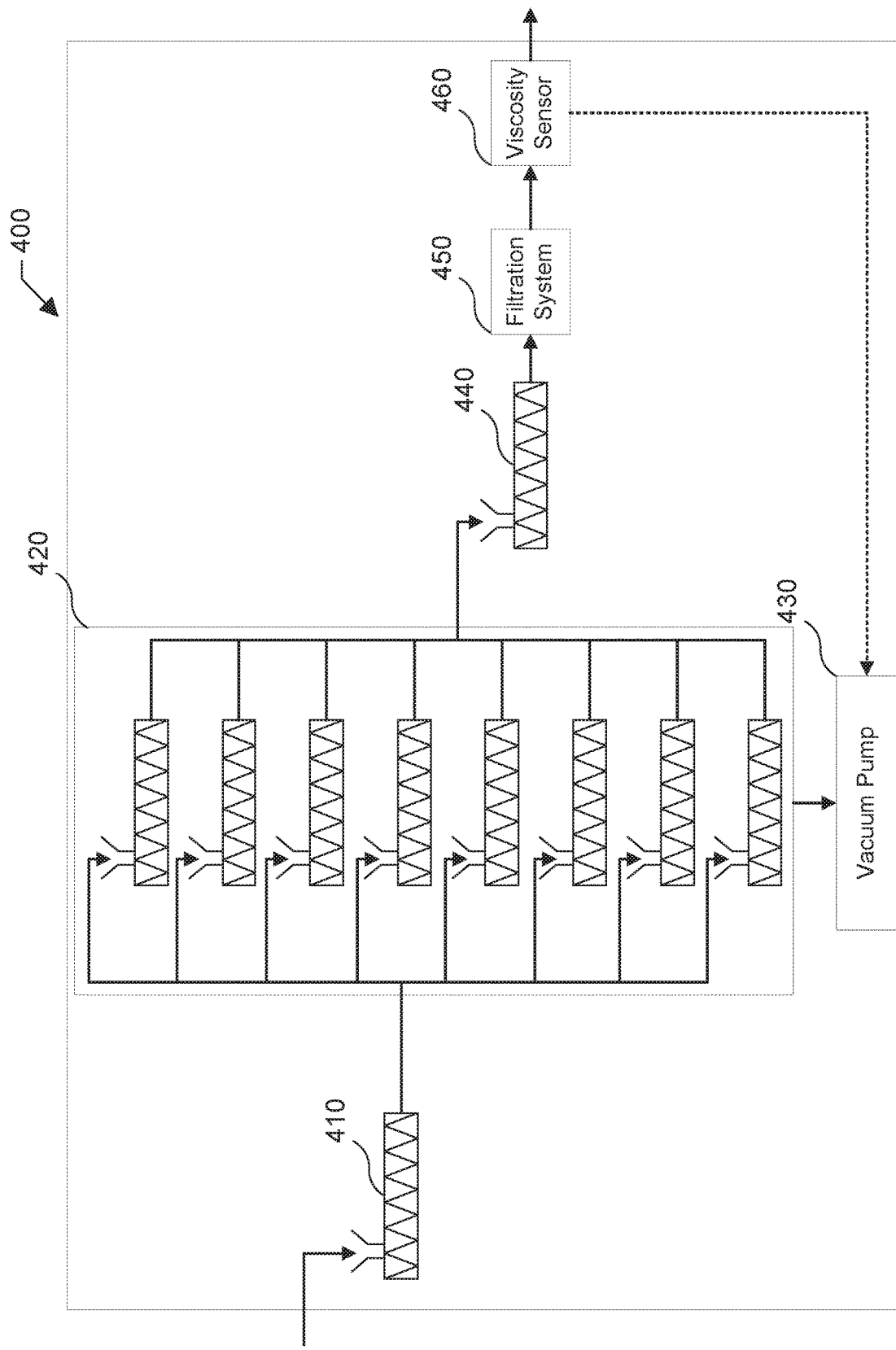
FIG. 4 depicts a process flow depicting the flow of polymer through an MRS extruder and filtration system according to a particular embodiment.

FIG. 4 depicts a process flow that illustrates the various processes performed by the MRS Extruder 400 in a particular embodiment. In the embodiment shown in this figure, the wet flakes are first fed through the MRS extruder's first single-screw extruder section 410, which may, for example, generate sufficient heat (e.g., via shearing) to at least substantially melt (e.g., melt) the wet flakes.

The resultant polymer melt (e.g., comprising the melted flakes), in various embodiments, is then fed into the extruder's MRS section 420, in which the extruder separates the melt flow into a plurality of different streams (e.g., 4, 6, 8, or more streams) through a plurality of open chambers. FIG. 3 shows a detailed cutaway view of an MRS Section 420 according to a particular embodiment. In particular embodiments, such as the embodiment shown in this figure, the MRS Section 420 separates the melt flow into eight different streams, which are subsequently fed through eight satellite screws 425A-H. As may be understood from FIG. 2, in particular embodiments, these satellite screws are substantially parallel (e.g., parallel) to one other and to a primary screw axis of the MRS Machine 400.

In the MRS section 420, in various embodiments, the satellite screws 425A-H may, for example, rotate faster than (e.g., about four times faster than) in previous systems. As shown in FIG. 3, in particular embodiments: (1) the satellite screws 425A-H are arranged within a single screw drum 428 that is mounted to rotate about its central axis; and (2) the satellite screws 425A-H are configured to rotate in a direction that is opposite to the direction in which the single screw drum rotates 428. In various other embodiments, the satellite screws 425A-H and the single screw drum 428 rotate in the same direction. In particular embodiments, the rotation of the satellite screws 425A-H is driven by a ring gear. Also, in various embodiments, the single screw drum 428 rotates about four times faster than each individual satellite screw 425A-H. In certain embodiments, the satellite screws 425A-H rotate at substantially similar (e.g., the same) speeds.

In various embodiments, as may be understood from FIG. 4, the satellite screws 425A-H are housed within respective extruder barrels, which may, for example be about 30% open to the outer chamber of the MRS section 420. In particular embodiments, the rotation of the satellite screws 425A-H and single screw drum 428 increases the surface exchange of the polymer melt (e.g., exposes more surface area of the melted polymer to the open chamber than in previous systems). In various embodiments, the MRS section 420 creates a melt surface area that is, for example, between about twenty and about thirty times greater than the melt surface area created by a co-rotating twin screw extruder. In a particular embodiment, the MRS section 420 creates a melt surface area that is, for example, about twenty five times greater than the melt surface area created by a co-rotating twin screw extruder In various embodiments, the MRS extruder's MRS Section 420 is fitted with a Vacuum Pump 430 that is attached to a vacuum attachment portion 422 of the MRS section 420 so that the Vacuum Pump 430 is in communication with the interior of the MRS section via a suitable opening 424 in the MRS section's housing. In still other embodiments, the MRS Section 420 is fitted with a series of Vacuum Pumps. In particular embodiments, the Vacuum Pump 430 is configured to reduce the pressure within the interior of the MRS Section 420 to a pressure that is between about 0.5 millibars and about 5 millibars. In particular embodiments, the Vacuum Pump 430 is configured to reduce the pressure in the MRS Section 420 to less than about 1.5 millibars (e.g., about 1 millibar or less). The low-pressure vacuum created by the Vacuum Pump 430 in the MRS Section 420 may remove, for example: (1) volatile organics present in the melted polymer as the melted polymer passes through the MRS Section 420; and/or (2) at least a portion of any interstitial water that was present in the wet flakes when the wet flakes entered the MRS Extruder 400. In various embodiments, the low-pressure vacuum removes substantially all (e.g., all) of the water and contaminants from the polymer stream.

In a particular example, the Vacuum Pump 430 comprises three mechanical lobe vacuum pumps (e.g., arranged in series) to reduce the pressure in the chamber to a suitable level (e.g., to a pressure of about 1.0 millibar). In other embodiments, rather than the three mechanical lobe vacuum pump arrangement discussed above, the Vacuum Pump 430 includes a jet vacuum pump fit to the MRS extruder. In various embodiments, the jet vacuum pump is configured to achieve about 1 millibar of pressure in the interior of the MRS section 420 and about the same results described above regarding a resulting intrinsic viscosity of the polymer melt. In various embodiments, using a jet vacuum pump can be advantageous because jet vacuum pumps are steam powered and therefore substantially self-cleaning (e.g., self-cleaning), thereby reducing the maintenance required in comparison to mechanical lobe pumps (which may, for example, require repeated cleaning due to volatiles coming off and condensing on the lobes of the pump). In a particular embodiment, the Vacuum Pump 430 is a jet vacuum pump is made by Arpuma GmbH of Bergheim, Germany.

In particular embodiments, after the molten polymer is run the through the multi-stream MRS Section 420, the streams of molten polymer are recombined and flow into the MRS extruder's second single screw section 440. In various embodiments, the single stream of molten polymer is next run through a filtration system 450 that includes at least one filter. In a particular embodiment, the filtration system 450 includes two levels of filtration (e.g., a 40 micron screen filter followed by a 25 micron screen filter). Although, in various embodiments, water and volatile organic impurities are removed during the vacuum process as discussed above, particulate contaminates such as, for example, aluminum particles, sand, dirt, and other contaminants may remain in the polymer melt. Thus, this filtration step may be advantageous in removing particulate contaminates (e.g., particulate contaminates that were not removed in the MRS Section 420).

In particular embodiments, a viscosity sensor 460 (see FIG. 4) is used to sense the melt viscosity of the molten polymer stream following its passage through the filtration system 450. In various embodiments, the viscosity sensor 460, measures the melt viscosity of the stream, for example, by measuring the stream's pressure drop across a known area. In particular embodiments, in response to measuring an intrinsic viscosity of the stream that is below a predetermined level (e.g., below about 0.8 g/dL), the system may: (1) discard the portion of the stream with low intrinsic viscosity; and/or (2) lower the pressure in the MRS Section 420 in order to achieve a higher intrinsic viscosity in the polymer melt. In particular embodiments, decreasing the pressure in the MRS Section 420 is executed in a substantially automated manner (e.g., automatically) using the viscosity sensor in a computer-controlled feedback control loop with the vacuum section 430.

In particular embodiments, removing the water and contaminates from the polymer improves the intrinsic viscosity of the recycled PET polymer by allowing polymer chains in the polymer to reconnect and extend the chain length. In particular embodiments, following its passage through the MRS Section 420 with its attached Vacuum Pump 430, the recycled polymer melt has an intrinsic viscosity of at least about 0.79 dL/g (e.g., of between about 0.79 dL/g and about 1.00 dL/g). In particular embodiments, passage through the low pressure MRS Section 420 purifies the recycled polymer melt (e.g., by removing the contaminants and interstitial water) and makes the recycled polymer substantially structurally similar to (e.g., structurally the same as) pure virgin PET polymer. In particular embodiments, the water removed by the vacuum includes both water from the wash water used to clean the recycled PET bottles as described above, as well as from unreacted water generated by the melting of the PET polymer in the single screw heater 410 (e.g., interstitial water). In particular embodiments, the majority of water present in the polymer is wash water, but some percentage may be unreacted water.

In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products.

Step 3: Purified PET Polymer Fed into Spinning Machine to be Turned into Carpet Yarn In particular embodiments, after the recycled PET polymer has been extruded and purified by the above-described extrusion process, the resulting molten recycled PET polymer is fed directly into a BCF (or "spinning") machine 500 that is configured to turn the molten polymer into bulked continuous filament. For example, in various embodiments, the output of the MRS extruder 400 is connected substantially directly (e.g., directly) to the input of the spinning machine 500 so that molten polymer from the extruder is fed directly into the spinning machine 500. This process may be advantageous because molten polymer may, in certain embodiments, not need to be cooled into pellets after extrusion (as it would need to be if the recycled polymer were being mixed with virgin PET polymer). In particular embodiments, not cooling the recycled molten polymer into pellets serves to avoid potential chain scission in the polymer that might lower the polymer's intrinsic viscosity.

In particular embodiments, the spinning machine 500 extrudes molten polymer through small holes in a spinneret in order to produce carpet yarn filament from the polymer. In particular embodiments, the molten recycled PET polymer cools after leaving the spinneret. The carpet yarn is then taken up by rollers and ultimately turned into filaments that are used to produce carpet. In various embodiments, the carpet yarn produced by the spinning machine 500 may have a tenacity between about 3 gram-force per unit denier (gf/den) and about 9 gf/den. In particular embodiments, the resulting carpet yarn has a tenacity of at least about 3 gf/den.

In particular embodiments, the spinning machine 500 used in the process described above is the Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlika Neumag of Neumuenster, Germany or any other company.

In various embodiments, the improved strength of the recycled PET polymer generated using the process above allows it to be run at higher speeds through the spinning machine 500 than would be possible using pure virgin PET polymer. This may allow for higher processing speeds than are possible when using virgin PET polymer.

Summary of Exemplary Process

Figure 5:
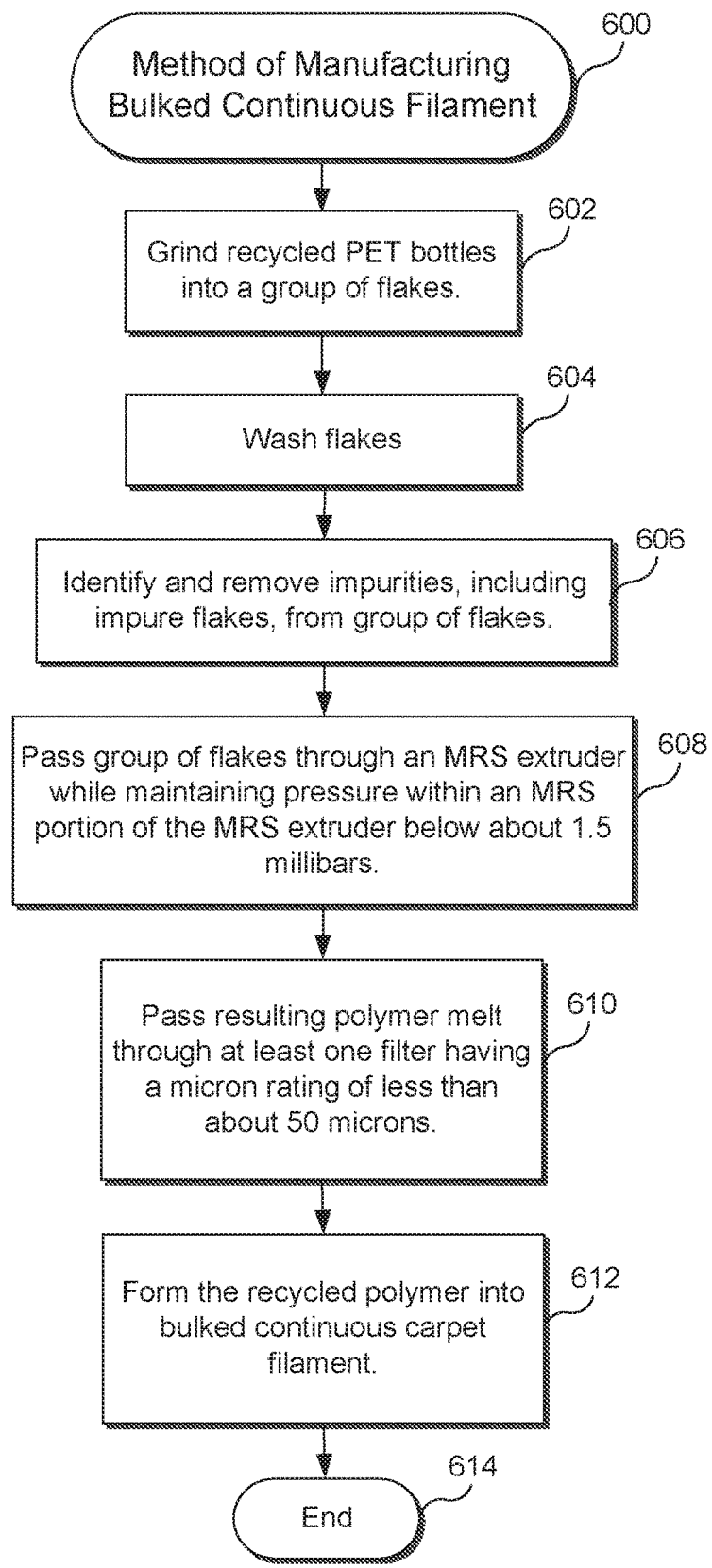
FIG. 5 is a high-level flow chart of a method, according to various embodiments, of manufacturing bulked continuous carpet filament.

FIG. 5 provides a high-level summary of the method of manufacturing bulked continuous filament described above. As shown in the figure, the method begins at Step 602, where recycled PET bottles are ground into a group of flakes. Next, at Step 604, the group of flakes is washed to remove contaminants from the flakes' respective outer surfaces. Next, at Step 606, the group of flakes is scanned (e.g., using one or more of the methods discussed above) to identify impurities, including impure flakes. These impurities, and impure flakes, are then removed from the group of flakes.

Next, at Step 608, the group of flakes is passed through an MRS extruder while maintaining the pressure within an MRS portion of the extruder below about 1.5 millibars. At Step 610, the resulting polymer melt is passed through at least one filter having a micron rating of less than about 50 microns. Finally, at Step 612, the recycled polymer is formed into bulked continuous carpet filament, which may be used in producing carpet. The method then ends at Step 614.

Alternative Embodiments

In particular embodiments, the system may comprise alternative components or perform alternative processes in order to produce substantially continuous BCF from 100% recycled PET, or other recycled polymer. Exemplary alternatives are discussed below.

Non-MRS Extrusion System

In particular embodiments, the process may utilize a polymer flow extrusion system other than the MRS Extruder described above. The alternative extrusion system may include for example, a twin screw extruder, a multiple screw extruder, a planetary extruder, or any other suitable extrusion system. In a particular embodiment, the process may include a plurality of any combination of any suitable conical screw extruders (e.g., four twin screw extruders, three multiple screw extruders, etc.).

Making Carpet Yarn from 100% Recycled Carpet

In particular embodiments, the process described above may be adapted for processing and preparing old carpet (or any other suitable post-consumer product) to produce new carpet yarn comprising 100% recycled carpet. In such embodiments, the process would begin by grinding and washing recycled carpet rather than recycled PET bottles. In various embodiments where old carpet is converted into new carpet yarn comprising 100% recycled carpet, the process may comprise additional steps to remove additional materials or impurities that may be present in recycled carpet that may not be present in recycled PET bottles (e.g., carpet backing, adhesive, etc.).

Other Sources of Recycled PET

In various embodiments, the process described above is adapted for processing recycled PET from any suitable source (e.g., sources other than recycled bottles or carpet) to produce new carpet yarn comprising 100% recycled PET.

The Use of a Crystallizer as Part of BCF Process

In various embodiments, the process for producing recycled BCF may further include a crystallizing step that utilizes one or more PET crystallizers. In particular embodiments, the system is configured to perform the crystallization step on the ground flakes prior to running the flakes through the one or more extruders (e.g., single screw extruder, MRS extruder, etc.). In particular embodiments, the PET crystallizer comprises a housing, a hopper screw (e.g., an auger) disposed at least partially within the housing, a stirring apparatus, one or more heating elements, and one or more blowers.

Hopper Screw

In particular embodiments, the hopper screw comprises any suitable screw conveyor (e.g., such as an Archimedes' screw) for moving liquid or granular materials (e.g., such as PET flakes). In various embodiments, the hopper screw comprises a substantially cylindrical shaft and a helical screw blade disposed along at least a portion of the cylindrical shaft. In particular embodiments, the substantially cylindrical shaft is configured to rotate the screw blade, causing that hopper screw to move material (e.g., the PET flakes) along the cylindrical shaft and into the crystallizer housing. In other embodiments, the hopper screw comprises any other suitable screw conveyer such as, for example, a shaftless spiral. In embodiments in which the hopper screw comprises a shaftless spiral, the shaftless spiral may be substantially fixed at one end and free at the other end and configured to be driven at the fixed end. In various embodiments, the hopper screw is disposed at least partially within the crystallizer housing.

In various embodiments, the hopper screw is configured to feed PET flakes into the crystallizer. In various embodiments, the PET crystallizer is configured to feed the PET flakes into the crystallizer using the hopper screw relatively slowly.

One or More Heating Elements

In various embodiments, the crystallizer comprises one or more heating elements for raising a temperature within the crystallizer. In particular embodiments, the one or more heating elements comprise one or more electric heating elements, one or more gas-fired heating elements, or any other suitable heating elements. In some embodiments, the one or more heating elements may be substantially electrically powered. In various embodiments, the one or more heating elements comprise one or more infra-red heating elements. In other embodiments, the one or more heating elements may utilize natural gas such, for example, propane. In particular embodiments, the one or more heating elements are configured to raise a temperature within the crystallizer to between about 100 degrees Fahrenheit and about 180 degrees Fahrenheit. In still other embodiments, the one or more heating elements are configured to raise a temperature within the crystallizer to between about 100 degrees Celsius and 180 degrees Celsius. In some embodiments, the one or more heating elements are configured to maintain a temperature within the crystallizer that is substantially about a maximum crystallization temperature of PET. In particular embodiments, the maximum crystallization temperature of PET is between about 140 degrees Celsius and about 230 degrees Celsius.

One or More Blowers

In various embodiments, the crystallizer further comprises one or more blowers configured to blow air over the flakes as the flakes passes through the crystallizer. In particular embodiments, the one or more blowers comprise any suitable blowers for moving air substantially across a surface area of the flakes as the flakes pass through the crystallizer. For example, in some embodiments, the one or more blowers comprise one or more suitable fans or other suitable mechanisms for moving air. In various embodiments, the one or more blowers are configured to blow air that has been at least partially heated by the one or more heating elements. In particular embodiments, the one or more blowers are configured to blow air having a temperature of at least about 140 degree Fahrenheit. In another particular embodiments, the one or more blowers are configured to blow air having a temperature of at least about 140 degree Celsius. In other embodiments, the one or more blowers are configured to maintain the temperature in the crystallizer between about 140 degrees Fahrenheit and about 180 degrees Fahrenheit. In some embodiments, the one or more blowers are configured to blow hot air from a bottom portion of the crystallizer and draw air from an upper portion of the crystallizer.

Stirring Apparatus

In various embodiments, the crystallizer comprises a stirring apparatus that comprises any suitable apparatus for stirring the PET flakes while the PET flakes are passing through the crystallizer. In various embodiments, the stirring apparatus may be operated, for example, by any suitable gear motor. In a particular embodiment, the stirring apparatus comprises a suitable rod or other suitable mechanism mounted to rotate, or otherwise stir the PET flakes as the PET flakes are passing through the crystallizer. In other embodiments, the stirring apparatus may comprise any suitable tumbler, which may, for example, comprise a drum mounted to rotate via the gear mother such that the PET flakes are at least partially stirred and/or agitated while the PET flakes are within the drum. In still other embodiments, the stirring apparatus comprises one or more screws and/or augers configured to rotate and stir the PET flakes. In particular embodiments, the stirring apparatus comprises the hopper screw.

As may be understood from this disclosure, the stirring apparatus is configured to agitate or stir the PET flakes as the one or more blowers blow air heated by the one or more heating elements across the PET flakes. In particular embodiments, the stirring apparatus is configured to at least partially reduce agglomeration (e.g., sticking or clumping of the flake) while the flake is at least partially crystallizing in the crystallizer.

In particular embodiments, the crystallizer at least partially dries the surface of the PET flakes. In various embodiments, the PET crystallizer is configured to reduce a moisture content of the PET flakes to about 50 ppm. In other embodiments the PET crystallizer is configured to reduce a moisture content of the PET flakes to between about 30 and about 50 ppm.

In various embodiments, the use of drier flakes may enable the system to run the flakes through the MRS extruder more slowly, which may allow for higher pressure within the MRS extruder during extrusion (e.g., may enable the system to maintain a higher pressure within the MRS extruder, rather than very low pressure). In various embodiments of the process, the pressure regulation system may be configured to maintain a pressure within the MRS extruder of between about 0 millibars and about 25 millibars. In particular embodiments, such as embodiments in which the PET flakes have been run through a crystallizer before being extruded in the MRS extruder, the pressure regulation system may be configured to maintain a pressure within the MRS extruder of between about 0 and about 18 millibars. In other embodiments, the pressure regulation system may be configured to maintain a pressure within the MRS extruder between about 0 and about 12 millibars. In still other embodiments, the pressure regulation system may be configured to maintain a pressure within the MRS extruder between about 0 and about 8 millibars. In still other embodiments, the pressure regulation system may be configured to maintain a pressure within the MRS extruder between about 5 millibars and about 10 millibars. In particular embodiments, the pressure regulation system may be configured to maintain a pressure within the MRS extruder at about 5 millibars, about 6 millibars, about 7 millibars, about 8 millibars, about 9 millibars, or about any suitable pressure between about 0 millibars and about 25 millibars.

In particular embodiments, the crystallizer causes the flakes to at least partially reduce in size, which may, for example, reduce a potential for the flakes to stick together. In particular embodiments, the crystallizer may particularly reduce stickiness of larger flakes, which may, for example, include flakes comprising portions of the ground PET bottles which may be thicker than other portions of the PET bottles (e.g., flakes ground from a threaded portion of the PET bottle on which a cap would typically be screwed).

Use of Curbside Recycling v. Deposit Bottles in Process

In various embodiments, the system is configured to utilize recycled PET of varying quality in the process described above. For example, in various embodiments, the system is configured to produce bulked continuous carpet filament from PET derived from PET bottles sourced from curbside recycling sources (e.g., PET bottles that were collected as part of a general bulk recycling program or other recycling source) as well as deposit PET bottles (e.g., bottles returned as part of a deposit program). In various embodiments, Curbside recycled bottles may require more thorough processing in order to produce bulked continuous filament, as curbside recycled PET bottles may be mixed in with and otherwise include contaminants such as, for example: other recyclable goods (e.g., paper, other plastics, etc.), garbage, and other non-PET bottle items due to imperfect sorting of recycled goods or for any other reason. Deposit PET bottles may include PET bottles with fewer unwanted contaminants due in part because deposit PET bottles may be collected separately from other recyclable or disposable goods.

In various embodiments, curbside recycled PET bottles acquired during particular times of year may include more impurities and other contaminants than at other times of the year. For example, curbside recycled PET bottles collected during summer months may comprise a higher percentage of clear PET bottles (e.g., water bottles) at least in part due to additional water consumption during summer months.

In various embodiments, the system described above may be configured to adjust particular components of the process based at least in part on the source of recycled PET being used to produce the bulked continuous carpet filament. For example, because deposit PET bottles include fewer impurities that need to be removed during the initial cleaning and sorting phases of the process, the pressure regulation system may be configured to maintain a pressure within the MRS extruder that is higher than a pressure that it would be configured to maintain for PET flake derived from curbside recycled PET bottles. In a particular embodiment, the pressure regulation system may be configured to maintain a pressure within the MRS extruder of between about 0 millibars and about 12 millibars when flakes derived from deposit PET bottles are passing through the MRS extruder. In still other embodiments, the pressure regulation system may be configured to maintain a pressure within the MRS extruder of between about 5 millibars and about 10 millibars in such instances.

In various embodiments, the system is configured to determine a suitable pressure at which to maintain the pressure within the MRS extruder based at least in part on the source of the recycled PET. In other embodiments, the system is configured to omit one or more of the steps above or include one or more additional steps to the steps described above based at least in part on the source of the recycled PET.

Direct Coupling of Various Process Components

Direct Coupling of MRS Extruder to Spinning Machine

In particular embodiments, the output of the MRS machine may be substantially directly coupled (e.g., directly coupled) to a spinning machine for forming the resulting molten polymer into bulked continuous filament. In such embodiments, after the recycled PET polymer has been extruded and purified by the above-described extrusion process, the resulting molten recycled PET polymer is fed substantially directly (e.g., directly) into the spinning machine. This process may be advantageous because molten polymer may, in certain embodiments, not need to be cooled into pellets after extrusion (as it would need to be if the recycled polymer were being mixed with virgin PET polymer) prior to spinning the molten polymer into filament. In particular embodiments, not cooling the recycled molten polymer into pellets serves to avoid potential chain scission in the polymer that might lower the polymer's intrinsic viscosity.

Direct Coupling of Non-MRS Extruder to Spinning Machine

In various embodiments of the process for recycling PET (e.g., or other polymers) into BCF, the recycled PET flakes are passed through an extruder other than an MRS extruder (e.g., a "first extruder") prior to spinning the resultant molten polymer into BCF. In particular embodiments, the first extruder is substantially directly coupled (e.g., directly coupled) to the spinning machine (e.g., an outlet of the first extruder is substantially directly coupled to an inlet of the spinning machine). For example, in various embodiments, an outlet of the first extruder is substantially directly coupled (e.g., via a suitable pipe, connector, etc.) to one or more inlets of one or more spinning machines. In particular embodiments, the first extruder may include any suitable expanded surface area extruder. In various embodiments, the first extruder may include, for example, a twin screw extruder, a multiple screw extruder, a planetary extruder, or any other suitable extrusion system (e.g., any other suitable expanded surface area extruder). In various embodiments, the first extruder is any suitable extruder for increasing an amount of surface area of a polymer melt being extruded by the first extruder that is exposed to a low pressure within the first extruder (e.g., a low pressure caused by a pressure regulation system, such as any suitable pressure regulation system described above). In a particular embodiment, the first extruder is an MAS extruder manufactured by Maschinen and Anlagenbau Schulz GmbH of Pucking, Austria.

In various embodiments, the first extruder is a conical co-rotating twin screw extruder. In such embodiments, the first extruder comprises an extruder housing in which two, co-rotating conical screws are disposed (e.g., a first conical screw and a second conical screw). In various embodiments, each conical screw is substantially conical (e.g., conical) such that the screw narrows from a first diameter at a base end of each respective conical screw to a second diameter at a vertex end of each respective conical screw that is less than the first diameter. In various embodiments, each particular conical screw may have any suitable thread or threading. In some embodiments, each conical screw has a substantially uniform (e.g., uniform) thread pitch and thread crest along at least a portion of the conical screw. In other embodiments, thread pitch and crest may at least partially vary along a length of the particular conical screw. In still other embodiments, a difference between a major and minor diameter of the conical screw may vary along a length of the conical screw (e.g., the screw thread may be larger or smaller along particular portions of the conical screw). In a particular embodiment, the pitch of thread of a particular conical screw may decrease along the conical screw from the base portion to the vertex portion. In particular embodiments, the first and second conical screws are substantially structurally identical (e.g., structurally identical).

In particular embodiments, the two conical screws are oriented within the conical twin screw extruder such that the base portion of each screw is disposed adjacent an intake (e.g., inlet) of the conical twin screw extruder, and the vertex portion of each screw is disposed adjacent an outlet of the conical twin extruder. In particular embodiments, a central axis of the first conical screw forms an acute angle with the central axis of the second conical screw. In various embodiments, the first and second conical screws are disposed such that at least a portion of the thread of the first conical screw at least partially mates with (e.g., mates with) at least a portion of the thread of the second conical screw. In other embodiments, at least a portion of the thread of the first conical screw at least partially engages with (e.g., engages with) at least a portion of the thread of the second conical screw In particular embodiments, the conical twin screw extruder may be configured to at least partially melt the plurality of flakes into a polymer melt. In such embodiments, the conical twin screw extruder may, for example, generate sufficient heat (e.g., via shearing) to at least substantially melt (e.g., melt) the flakes. In particular embodiments, the first extruder is configured to increase a surface area of the polymer melt. In various embodiments, the conical design of the conical twin screw extruder may result in an intake volume that is substantially greater (e.g., greater) than a discharge volume of the conical twin screw extruder. This higher intake volume, in various embodiments, may result in a high volume throughput per revolution of the twin conical screws. In various embodiments, the first extruder is configured to receive a plurality of polymer flakes (e.g., PET flakes) via a first extruder inlet, melt the plurality of flakes into a polymer melt while extruding the plurality of flakes, and pass the resulting polymer melt though an extruder outlet.

In various embodiments, the first extruder comprises a pressure regulation system configured to reduce a pressure within the first extruder. In a particular embodiment, the first extruder is fitted with a suitable vacuum pump such that the vacuum pump is in communication with an interior of the first extruder's housing via a suitable opening in the first extruder's housing. In still other embodiments, the first extruder is fitted with a series of vacuum pumps. In particular embodiments, the vacuum pump is configured to reduce the pressure within the interior of the first extruder to a pressure that is between about 0millibars and about 25 millibars. In other embodiments, the vacuum pump is configured to reduce a pressure within the first extruder to between about 5 millibars and about 18 millibars. In still other embodiments, the vacuum pump is configured to reduce a pressure within the first extruder to any particular suitable pressure between about 0 millibars and about 25 millibars. In various embodiments, the low-pressure vacuum created by the vacuum pump in the first extruder may remove, for example: (1) volatile organics present in the melted polymer as the melted polymer passes through the first extruder; and/or (2) at least a portion of any interstitial water that was present in the wet flakes when the wet flakes entered the first extruder. In various embodiments, the low-pressure vacuum removes substantially all (e.g., all) of the water and contaminants from the polymer stream. In various embodiments, the vacuum pump may include any suitable vacuum pump, such as any vacuum pump described above or any other suitable vacuum pump.

In embodiments in which the system includes a first extruder directly coupled to the spinning machine, the process may include passing the plurality of flakes (e.g., a plurality of wet flakes after a washing step) through the first extruder to at least partially melt the plurality of flakes into a polymer melt and remove at least a portion of the impurities from the polymer melt. The polymer melt is then fed substantially directly (e.g., directly) into the spinning machine for spinning into bulked continuous carpet filament.

CONCLUSION

Many modifications and other embodiments of the invention will come to mind to one skilled in the art to which this invention pertains having the benefit of the teachings presented in the foregoing descriptions and the associated drawings. For example, although the vacuum system discussed above is described as being configured to maintain the pressure in the open chambers of the MRS extruder to about 1 mbar, in other embodiments, the vacuum system may be adapted to maintain the pressure in the open chambers of the MRS extruder at pressures greater than, or less than, 1 mbar. For example, the vacuum system may be adapted to maintain this pressure at between about 0.5 mbar and about 12 mbar.

Similarly, although various embodiments of the systems described above may be adapted to produce carpet filament from substantially only recycled PET (so the resulting carpet filament would comprise, consist of, and/or consist essentially of recycled PET), in other embodiments, the system may be adapted to produce carpet filament from a combination of recycled PET and virgin PET. The resulting carpet filament may, for example, comprise, consist of, and/or consist essentially of between about 80% and about 100% recycled PET, and between about 0% and about 20% virgin PET.

Also, while various embodiments are discussed above in regard to producing carpet filament from PET, similar techniques may be used to produce carpet filament from other polymers. Similarly, while various embodiments are discussed above in regard to producing carpet filament from PET, similar techniques may be used to produce other products from PET or other polymers.

In addition, it should be understood that various embodiments may omit any of the steps described above or add additional steps.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A method of manufacturing bulked continuous carpet filament, the method comprising:
   (A) washing a plurality of flakes comprising recycled PET;
   (B) providing a PET crystallizer;
   (C) after the step of washing the plurality of flakes comprising recycled PET, passing at least a portion of the plurality of flakes comprising recycled PET through the PET crystallizer;
   (D) providing an expanded surface area extruder, wherein the expanded surface area extruder defines an expanded surface area extruder inlet and an expanded surface area extruder outlet, and an MRS Section comprising: a plurality of satellite screws, each of the plurality of satellite screws being at least partially housed within a respective extruder barrel and mounted to rotate about its respective central axis; and a satellite screw extruder support system that is adapted to orbitally rotate each of the plurality of satellite screws about a main axis as each of the plurality of satellite screws rotate about its respective central axis, the main axis being substantially parallel to each respective central axis;

(E) providing a pressure regulation system configured to reduce a pressure within at least a portion of the expanded surface area extruder;

(F) providing a spinning machine defining a spinning machine inlet, wherein the spinning machine inlet is operatively coupled to the expanded surface area extruder outlet;

(G) using the pressure regulation system to reduce the pressure within the at least a portion of the expanded surface area extruder;

(H) after passing the plurality of flakes comprising recycled PET through the PET crystallizer, passing the plurality of flakes comprising recycled PET through the expanded surface area extruder via the expanded surface area extruder inlet to at least partially melt the plurality of flakes to form a polymer melt; and (I) substantially immediately after passing the plurality of flakes through the expanded surface area extruder, using the spinning machine to form the polymer melt into bulked continuous carpet filament.

2. The method of claim 1, wherein the expanded surface area extruder is configured to increase a surface area of the polymer melt as the polymer melt passes through the expanded surface area extruder utilizing at least eight different streams of polymer melt.

3. The method of claim 2, wherein the method further comprises exposing the at least eight different streams of polymer melt to the pressure within the at least the portion of the expanded surface area extruder.

4. The method of claim 3, wherein using the pressure regulation system to reduce the pressure within the at least the portion of the expanded surface area extruder comprises reducing the pressure to below about 25 millibar.

5. The method of claim 1, wherein the PET crystallizer comprises:
one or more heating elements configured to raise a temperature within the PET crystallizer; and
one or more blowers configured to blow air that has been at least partially heated by the one or more heating elements over the plurality of flakes comprising recycled PET as the plurality of flakes pass through the PET crystallizer.

6. The method of claim 5, wherein the one or more blowers are configured to blow the air from a bottom portion of the PET crystallizer.

7. The method of claim 5, wherein the PET crystallizer is configured to at least partially dry a surface of the plurality of flakes comprising recycled PET.

8. The method of claim 7, wherein the PET crystallizer is configured to reduce a moisture content of the plurality of flakes comprising recycled PET to below about 50 ppm.

9. A method for manufacturing bulked continuous carpet filament, the method comprising:
providing a crystallizer;
providing an extruder, wherein the extruder comprises a chamber and defines an extruder inlet and an extruder outlet;
providing a pressure regulation system configured to reduce a pressure within the chamber;
providing a spinning machine defining a spinning machine inlet, wherein the spinning machine inlet is operatively coupled to the extruder outlet;
using the pressure regulation system to reduce the pressure within the chamber;
passing a plurality of polymer flakes through the crystallizer;
after passing the plurality of polymer flakes through the crystallizer, melting the plurality of polymer flakes to create a polymer melt;
using the extruder to separate the polymer melt into a plurality of different streams, the plurality of different streams comprising at least eight streams of the polymer melt;
exposing each of the at least eight streams of the polymer melt to the pressure while the at least eight streams of the polymer melt are in the chamber;
after exposing the at least eight streams of the polymer melt to the pressure, recombining the at least eight streams into a single polymer stream; and
substantially immediately after recombining the at least eight streams into the single polymer stream, using the spinning machine to form polymer from the single polymer stream into bulked continuous carpet filament having a tenacity between about 3 gram-force per unit denier and about 9 gram-force per unit denier.

10. The method of claim 9, wherein using the spinning machine to form polymer from the single polymer stream into bulked continuous carpet filament substantially immediately after recombining the at least eight streams into the single polymer stream comprises passing the single polymer stream directly to the spinning machine inlet via the extruder outlet.

11. The method of claim 9, wherein using the pressure regulation system to reduce the pressure within the chamber comprises reducing the pressure within the chamber to below about 25 millibar.

12. The method of claim 9, wherein the crystallizer comprises:
one or more heating elements configured to raise a temperature within the crystallizer; and
one or more blowers configured to blow air that has been at least partially heated by the one or more heating elements over the plurality of polymer flakes as the plurality of polymer flakes pass through the crystallizer.

13. The method of claim 12, wherein the one or more blowers are configured to blow the air from a bottom portion of the crystallizer.

14. The method of claim 13, wherein the crystallizer is configured to at least partially dry a surface of the plurality of polymer flakes.

15. The method of claim 14, wherein the crystallizer is configured to reduce a moisture content of the plurality of polymer flakes to below about 50 ppm.

16. The method of claim 12, wherein the crystallizer comprises a stirring apparatus configured to stir the plurality of polymer flakes as the plurality of polymer flakes pass through the crystallizer.

17. The method of claim 9, wherein the method further comprises, prior to passing the plurality of polymer flakes through the crystallizer, washing the plurality of polymer flakes to remove at least a portion of one or more contaminants from the surface of the plurality of polymer flakes.

18. A method of manufacturing bulked continuous carpet filament, the method comprising:

(A) providing a PET crystallizer;

(B) passing at least a portion of the a plurality of flakes comprising recycled PET through the PET crystallizer to at least partially dry a surface of the plurality of flakes comprising recycled PET;

(C) providing an expanded surface area extruder, wherein the expanded surface area extruder defines an expanded surface area extruder inlet and an expanded surface area extruder outlet, and an MRS Section disposed between the expanded surface area extruder inlet and the expanded surface area extruder outlet comprising a plurality of satellite screws, each of the plurality of satellite screws being at least partially housed within a respective extruder barrel and mounted to rotate about its respective central axis;

(D) providing a pressure regulation system configured to reduce a pressure within at least a portion of the expanded surface area extruder below about 25 mbar;

(E) providing a spinning machine defining a spinning machine inlet, wherein the spinning machine inlet is operatively coupled to the expanded surface area extruder outlet;

(F) using the pressure regulation system to reduce the pressure within the at least a portion of the expanded surface area extruder below about 25 mbar;

(G) after passing the plurality of flakes comprising recycled PET through the PET crystallizer, passing the plurality of flakes comprising PET flakes through the expanded surface area extruder via the expanded surface area extruder inlet to at least partially melt the plurality of flakes to form a polymer melt such that at least a portion of the polymer melt is exposed to the pressure within the at least a portion of the expanded surface area extruder; and (H) substantially immediately after passing the plurality of flakes through the expanded surface area extruder, using the spinning machine to form the polymer melt into bulked continuous carpet filament.

19. The method of claim 18, wherein the PET crystallizer is configured to reduce a moisture content of the plurality of polymer flakes to below about 50 ppm.

20. The method of claim 18, wherein using the spinning machine to form the polymer melt into bulked continuous carpet filament substantially immediately after passing the plurality of flakes through the expanded surface area extruder comprises passing the polymer melt directly to the spinning machine inlet via the expanded surface area extruder outlet.

* * * * *

UNITED STATES PATENT AND TRADEMARK OFFICE
CERTIFICATE OF CORRECTION

PATENT NO. : 11,427,694 B2
APPLICATION NO. : 16/866708
DATED : August 30, 2022
INVENTOR(S) : Thomas R. Clark Page 1 of 1

It is certified that error appears in the above-identified patent and that said Letters Patent is hereby corrected as shown below:

In the Claims

Column 21 At Claim 18, Line 2, "(B) passing at least a portion of the a plurality of flakes" should read --(B) passing at least a portion of a plurality of flakes--.

Signed and Sealed this
Twenty-fourth Day of January, 2023

Katherine Kelly Vidal
*Director of the United States Patent and Trademark Office*